United States Patent [19]
Albritton

[11] Patent Number: 5,947,452
[45] Date of Patent: *Sep. 7, 1999

[54] ENERGY ABSORBING CRASH CUSHION

[75] Inventor: James R. Albritton, Aledo, Tex.

[73] Assignee: Exodyne Technologies, Inc., Fort Worth, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/870,118

[22] Filed: Jun. 5, 1997

Related U.S. Application Data

[60] Provisional application No. 60/019,435, Jun. 10, 1996, abandoned.

[51] Int. Cl.$^6$ .............................. B60R 19/34; E01F 15/00
[52] U.S. Cl. ............................... 256/13.1; 293/133; 404/6
[58] Field of Search .......................... 256/13.1; 293/133; 188/375; 404/6, 9

[56] References Cited

U.S. PATENT DOCUMENTS

| | | | |
|---|---|---|---|
| 2,837,176 | 6/1958 | Dropkin | 188/1 |
| 2,845,144 | 7/1958 | Bohn | 188/1 |
| 3,944,187 | 3/1976 | Walker | 256/13.1 |
| 4,008,915 | 2/1977 | Walker | 293/60 |
| 4,200,310 | 4/1980 | Carney, III | 280/784 |
| 4,352,484 | 10/1982 | Gertz et al. | 256/13.1 |
| 4,635,981 | 1/1987 | Friton | 293/1 |
| 4,645,375 | 2/1987 | Carney, III | 404/6 |
| 4,655,434 | 4/1987 | Bronstad | 256/13.1 |
| 4,711,481 | 12/1987 | Krage et al. | 293/133 |
| 4,822,208 | 4/1989 | Ivey | 404/6 |
| 4,823,923 | 4/1989 | Moyer | 188/376 |
| 4,909,661 | 3/1990 | Ivey | 404/6 |
| 4,928,928 | 5/1990 | Buth et al. | 256/13.1 |
| 5,011,326 | 4/1991 | Carney, III | 404/6 |
| 5,078,366 | 1/1992 | Sicking et al. | 256/13.1 |
| 5,112,028 | 5/1992 | Laturner | 256/13.1 |
| 5,199,755 | 4/1993 | Gertz | 293/120 |
| 5,248,129 | 9/1993 | Gertz | 256/13.1 |
| 5,403,112 | 4/1995 | Carney, III | 404/6 |

OTHER PUBLICATIONS

Alpha 60 MD, "Think Fast!" brochure, by Energy Absorption Systems, Inc.
"Traiload Traffic management Equipment" brochure, by Traiload Trailers Limited, UK.
"Renco Ren–Gard TMA (Truck Mounted Attenuator)," by Renco, Inc, Nov. 1992.
"When Lives are at Stake in Highway Construction Zones . . . " by Syro, a subsidiary of Trinity Industries.
"Development of a Metal Cutting W–Beam Guardrail Terminal" (Interstate Steel has the "BEST") by Pfeifer et al., Transportation Research Report TRP–03–43–94, Sep. 1994.
Letter with attachments to Don Johnson from U.S. Department of Transportation dated Jun. 12, 1996.
Letter with attachments to Don Johnson from U.S. Department of Transportation dated Oct. 30, 1996.

*Primary Examiner*—Anthony Knight
*Attorney, Agent, or Firm*—Baker & Botts, L.L.P.

[57] ABSTRACT

An energy absorbing system with one or more energy absorbing assemblies is provided to reduce or eliminate the severity of a collision between a moving motor vehicle and a roadway hazard. The energy absorbing system may be modified for use at a fixed roadside hazard such as the end of a concrete barrier or attached to the rear portion of a highway service vehicle. The energy absorbing system preferably includes an impact attenuator having at least one cutter and at least one energy absorbing element which are slidably disposed relative to each other. An impact plate is also attached to one end of the impact attenuator such that a collision by the motor vehicle with the impact plate will result in the cutter shearing the energy absorbing element to dissipate energy from the impact of the motor vehicle. The configuration and number of energy absorbing assemblies and the configuration and number of each energy absorbing element may be varied depending upon the intended application for the resulting energy absorbing system.

34 Claims, 9 Drawing Sheets

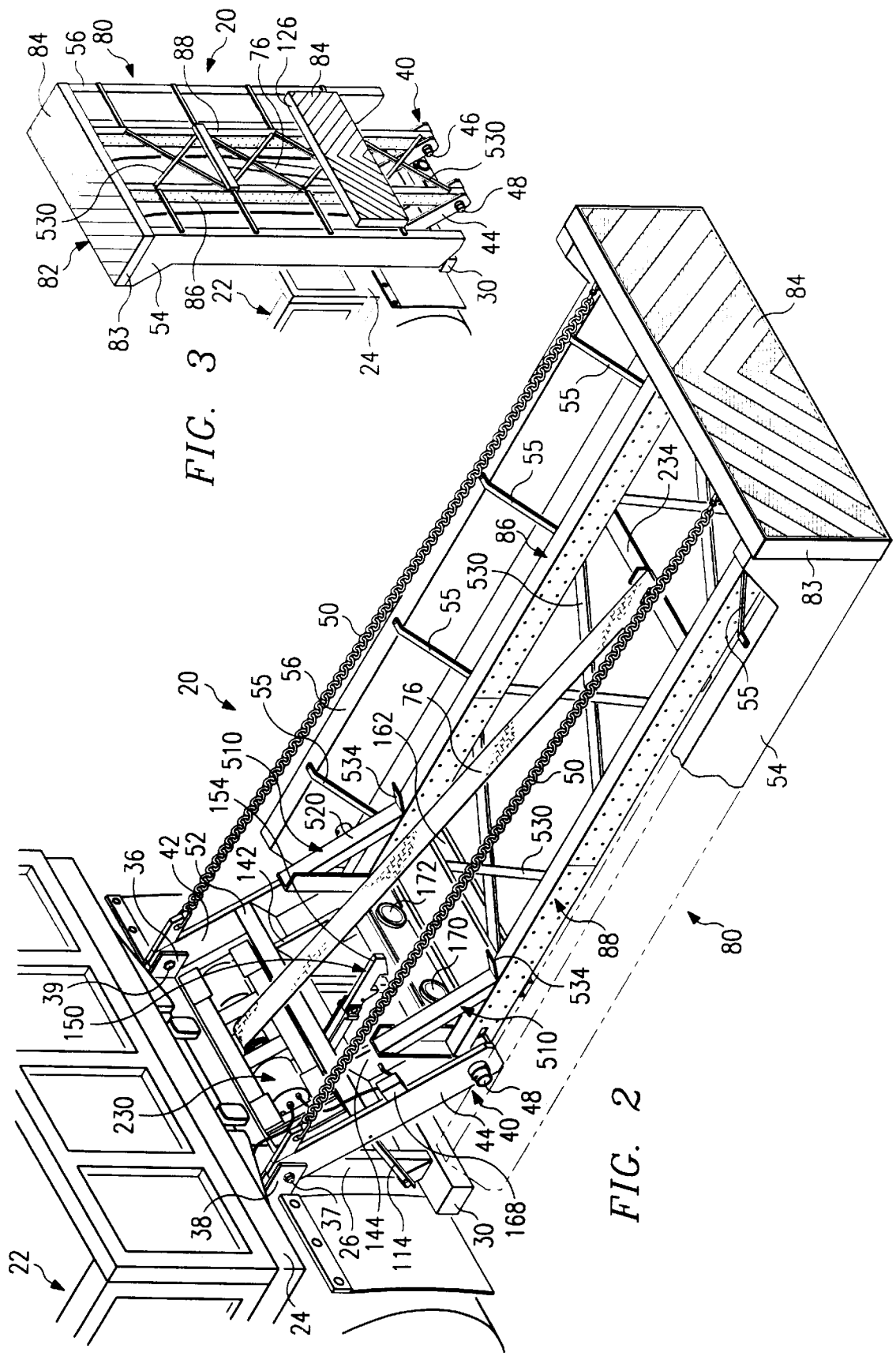

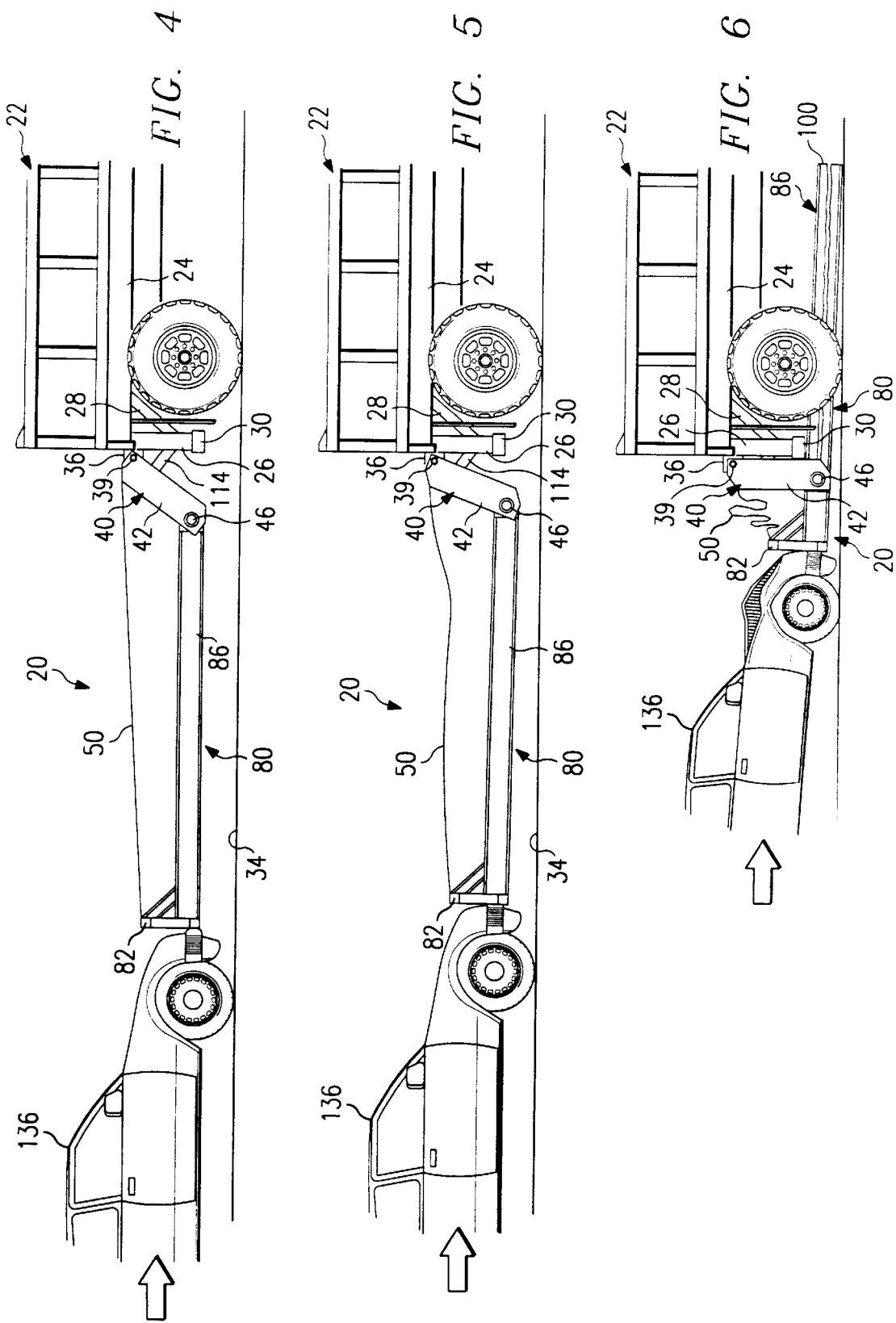

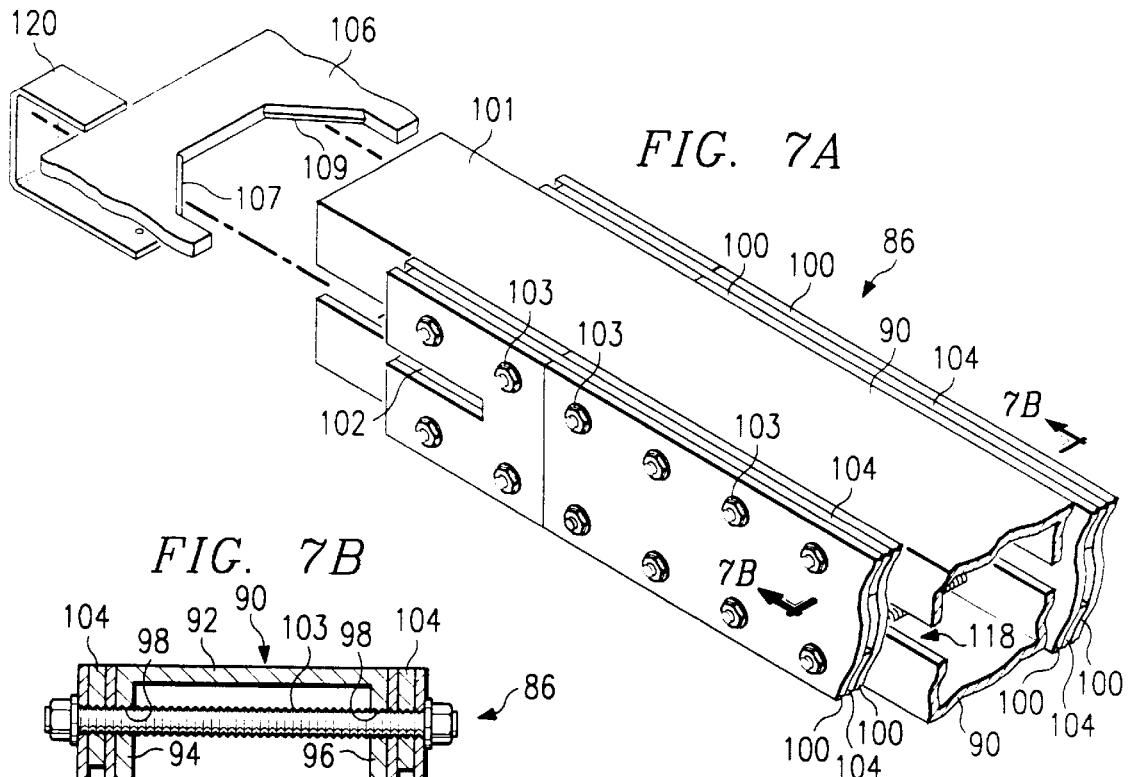
FIG. 7A
FIG. 7B
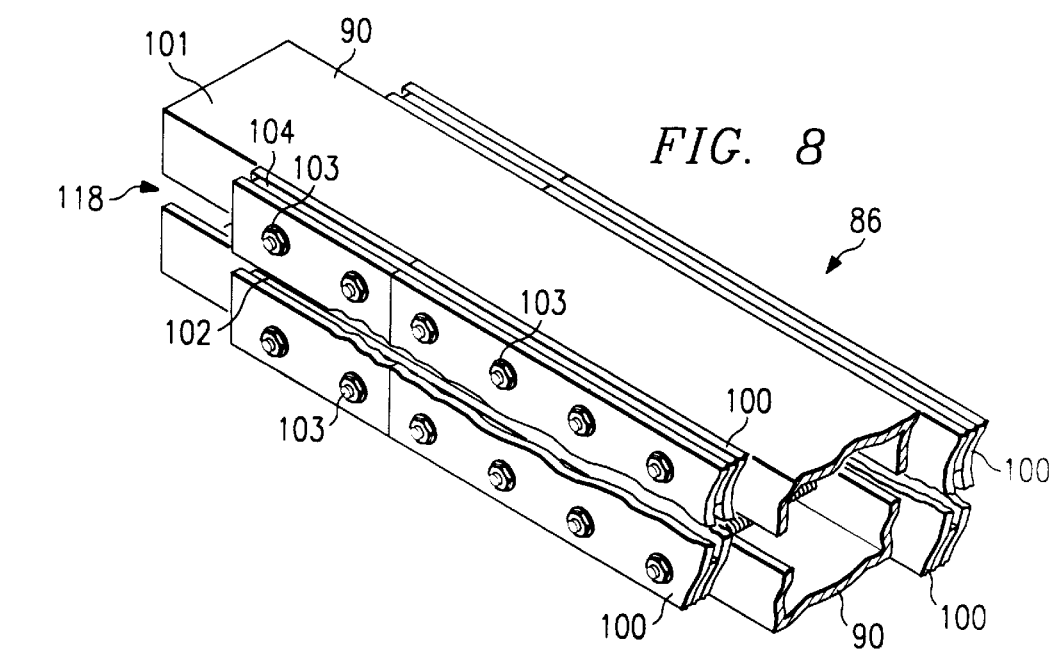
FIG. 8

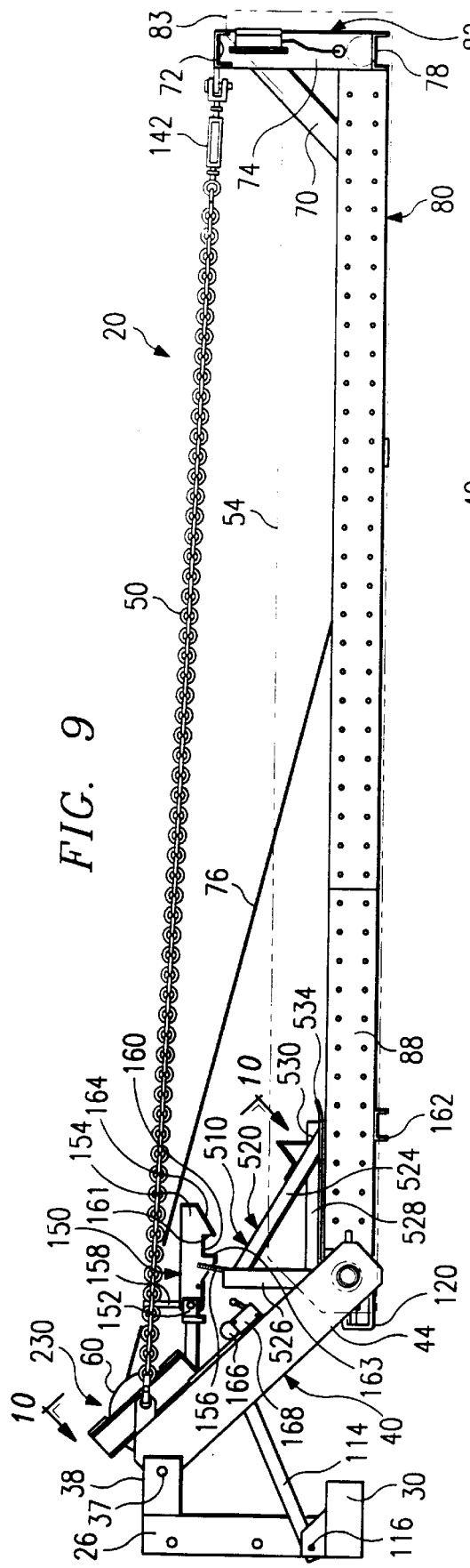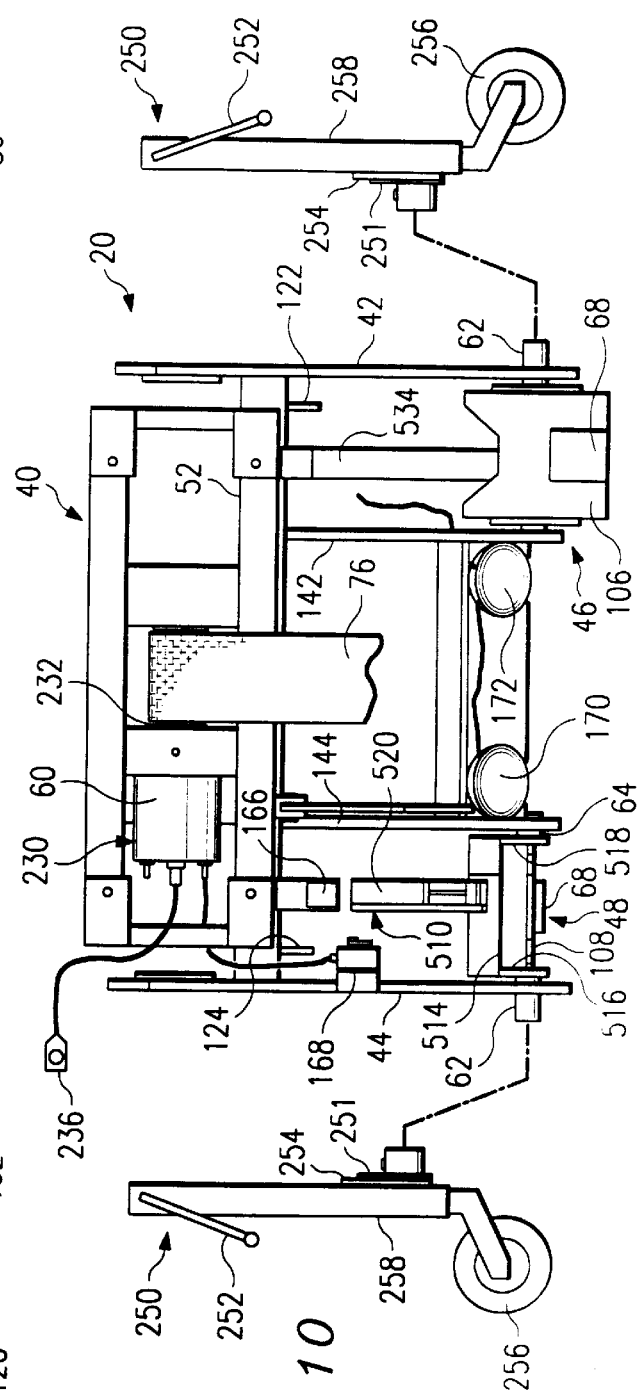

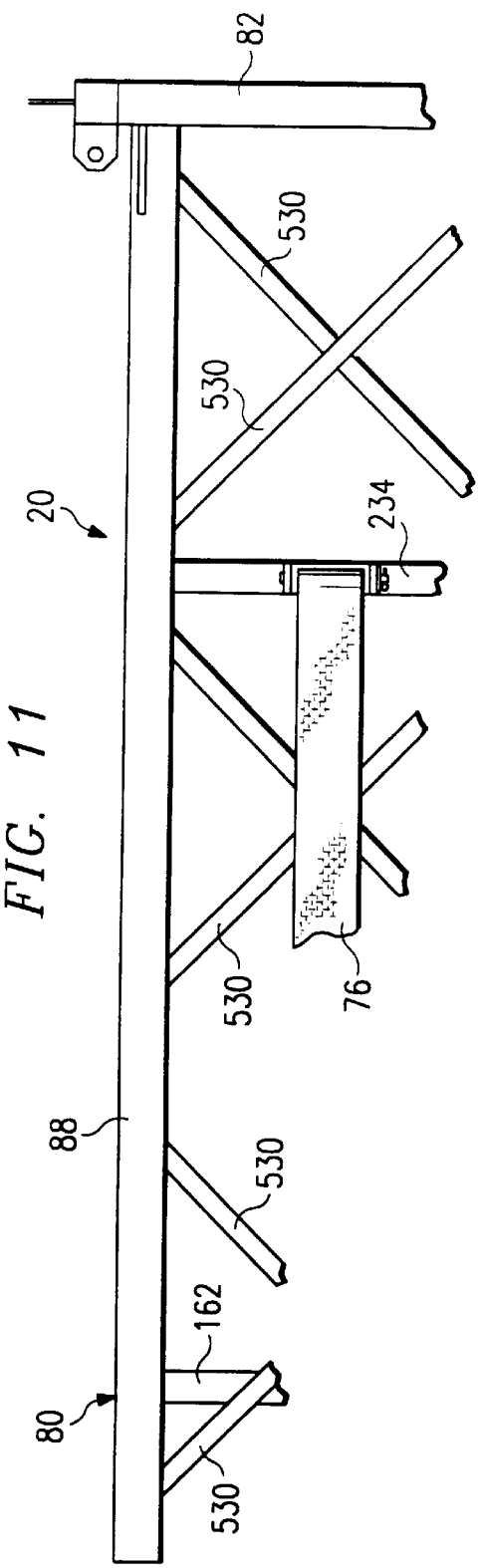
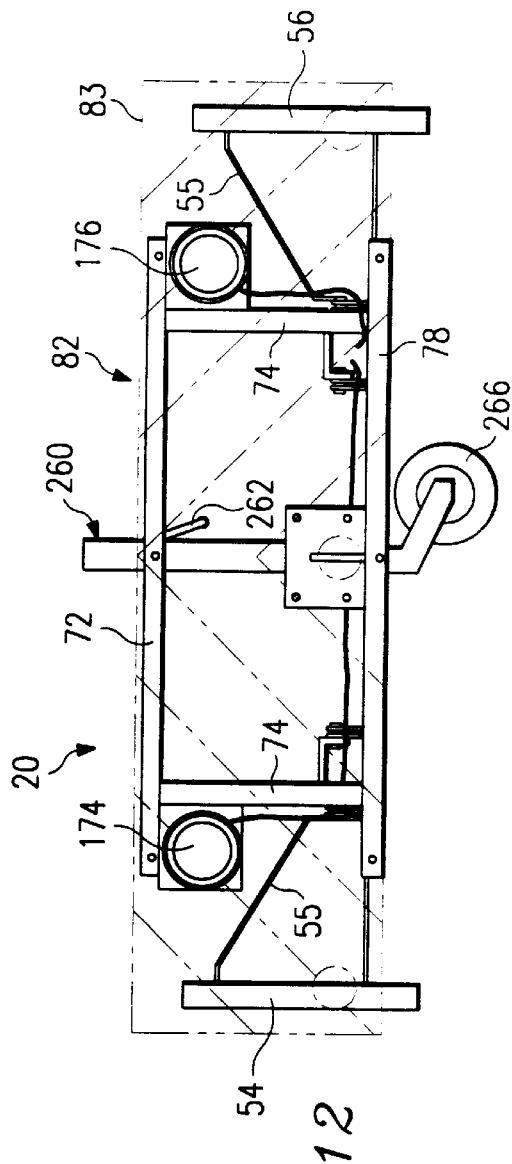
FIG. 11
FIG. 12

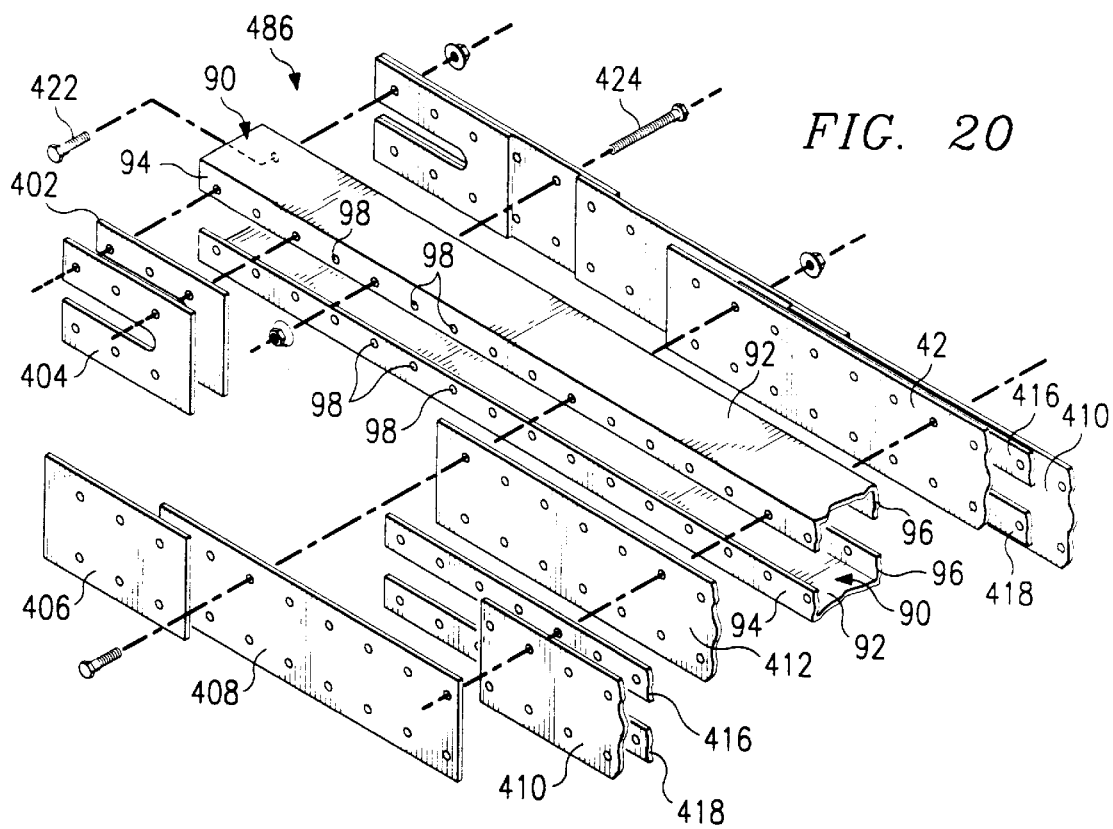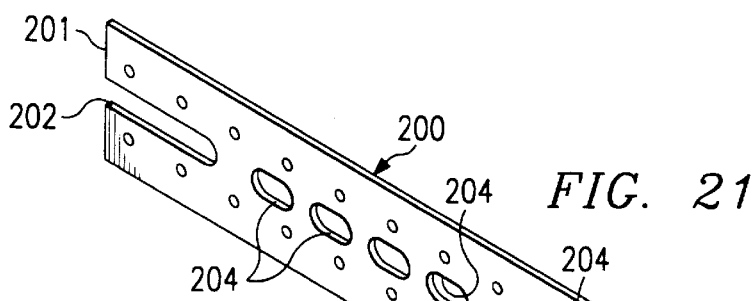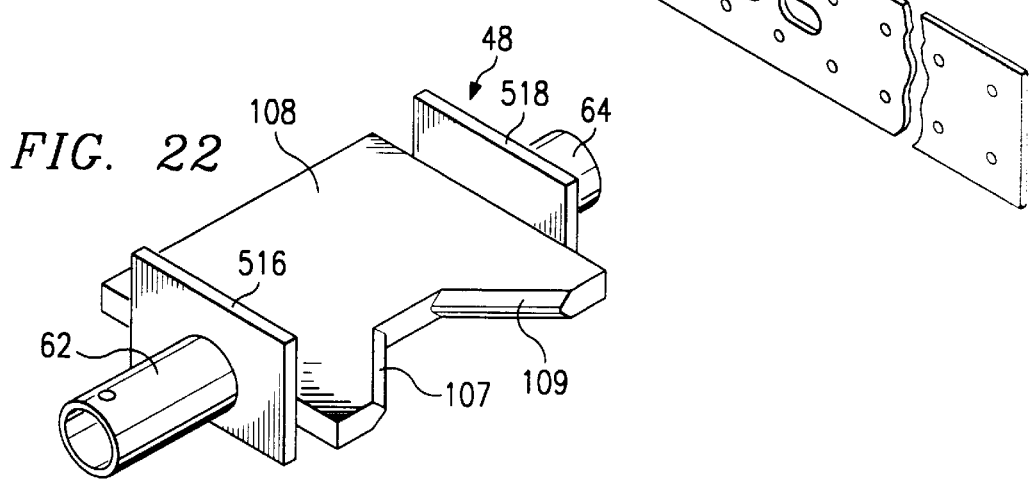

ENERGY ABSORBING CRASH CUSHION

RELATED APPLICATIONS

This application claims the benefit of U.S. Provisional Application Ser. lNo. 60/019,435 filed Jun. 10, 1996, now abandoned.

TECHNICAL FIELD OF THE INVENTION

This invention relates in general to the field of impact attenuation devices, and more particularly to an energy absorbing system which may be used to reduce the severity of a collision between a relatively fast moving motor vehicle and a slow moving or stopped highway service vehicle. An impact attenuation device incorporating teachings of the present invention may also be used to absorb energy resulting from a collision between a moving motor vehicle and a stationary hazard adjacent to a roadway.

BACKGROUND OF THE INVENTION

Various impact attenuation devices and energy absorbing systems have been used to prevent or reduce damage resulting from a collision between a moving motor vehicle and a roadway hazard. Potentially hazardous conditions include slow moving or stopped highway service vehicles and highway maintenance vehicles which are either on the roadway or adjacent to the roadway. Examples of prior impact attenuation devices and energy absorbing systems include various crash barriers with structures and containers having crushable elements. Other crash barriers rely on inertial forces generated when material such as sand is accelerated during an impact. A further approach includes positioning an energy absorbing system such as a truck mounted attenuator on the rear portion of a heavy duty truck or service vehicle and positioning the vehicle in front of a highway work zone.

Examples of impact attenuation devices and energy absorbing systems appropriate for use on a slow moving or stopped highway service vehicle are shown in U.S. Pat. No. 5,248,129 entitled *Energy Absorbing Roadside Crash Barrier;* U.S. Pat. No. 5,199,755 entitled *Vehicle Impact Attenuating Device;* U.S. Pat. No. 4,711,481 entitled *Vehicle Impact Attenuating Device;* U.S. Pat. No. 4,008,915 entitled *Impact Barrier for Vehicles.* Each of the preceding patents is incorporated by reference for all purposes in this application.

Various impact attenuation devices and energy absorbing systems have also been used to prevent or reduce damage resulting from a collision between a moving motor vehicle and a stationary roadside hazard. Some of these devices and systems have been developed for use at narrow roadside hazard sites such as at the end of a median barrier, edge of a roadway barrier, large sign post along the side of a roadway, and bridge pillars or center piers. Such impact attenuation devices and energy absorbing systems are installed in an effort to minimize the extent of personal injury as well as damage to a vehicle and structure associated with the roadside hazard resulting from vehicle impact with the roadside hazard. Examples of general purpose impact attenuation devices are shown in U.S. Pat. No. 5,011,326 entitled *Narrow Stationary Impact Attenuation System;* U.S. Pat. No. 4,352,484 entitled *Shear Action and Compression Energy Absorber;* U.S. Pat. No. 4,645,375 entitled *Stationary Impact Attenuation System;* and U.S. Pat. No. 3,944,187 entitled *Roadway Impact Attenuator.* Examples of specialized stationary energy absorbing systems are shown in U.S. Pat. No. 4,928,928 entitled *Guardrail Extruder Terminal* and U.S. Pat. No. 5,078,366 entitled *Guardrail Extruder Terminal.* Each of the preceding patents is incorporated by reference for all purposes in the present application.

Previous truck mounted attenuator systems suffered from problems such as vibration weakening or breaking internal adhesive joints and sagging of the system due to bond failure. Also, some prior truck mounted attenuator systems failed to perform properly as a result of absorbing moisture.

SUMMARY OF THE INVENTION

In accordance with the present invention, disadvantages and problems associated with previous impact attenuation devices and energy absorbing systems have been substantially reduced or eliminated. One aspect of the present invention includes providing a highly reliable truck mounted attenuator which is compact and durable as compared to prior bulky cushion systems. Another aspect of the present invention includes providing a trailer mounted energy absorbing system. A further aspect of the present invention includes providing a crash barrier which may be installed adjacent to a roadside hazard.

Technical advantages of the present invention include providing a truck mounted attenuator which may be fabricated at relatively low cost using conventional materials and processes that are well known to the highway safety industry. The resulting truck mounted attenuator combines innovative structural and energy absorbing techniques that are highly predictable and reliable. The truck mounted attenuator may be easily reused following vehicle impact by replacing one or more energy absorbing elements. Energy from vehicle impact is preferably absorbed by ripping, cutting or shearing one or more energy absorbing elements. A wide variety of metal strips and metal plates may be satisfactorily used as energy absorbing elements depending upon the intended application for the truck mounted attenuator. Also, the number of energy absorbing elements and their geometric configuration may be varied depending upon the intended application.

In accordance with one aspect of the present invention, an impact attenuator is provided for use with a highway service vehicle to minimize the consequences of an impact between another relatively fast moving motor vehicle and the highway service vehicle. A bracket assembly may be used to mount the impact attenuator on the rear portion of the highway service vehicle. The bracket assembly preferably has a first position which holds the impact attenuator extending approximately horizontal from the highway service vehicle at a first, vertical distance above the roadway. The bracket assembly will preferably move to a second position placing the impact attenuator at a second, lower vertical distance above the roadway. In this second position portions of the impact attenuator can slide longitudinally under the highway service vehicle in response to a collision or impact by a moving motor vehicle with the end of the impact attenuator opposite form the highway service vehicle. The bracket assembly preferably allows moving the impact attenuator to a third position in which the impact attenuator extends approximately vertical relative to the highway service vehicle and the associated roadway.

For one embodiment, the bracket assembly preferably includes a pair of support arms with one end of each arm pivotally attached to the rear portion of the highway service vehicle and the other end of each arm pivotally attached to the impact attenuator. One or more breakaway struts and shear bolts may be used to releasably hold the bracket assembly in its first position.

In accordance with another aspect of the present invention, an impact attenuator having one or more energy absorbing elements incorporating teachings of the present invention may be mounted on a trailer which is towed behind a highway service vehicle. A further aspect of the present invention includes providing an impact attenuator having one or more energy absorbing elements mounted adjacent to one end of a fixed roadside hazard facing oncoming traffic.

Further technical advantages of the present invention include providing relatively low cost truck mounted attenuators which meets the criteria of National Cooperative Highway Research Program (NCHRP) 350 including the requirements of Level 2 and Level 3. The resulting truck mounted attenuator is relatively light weight as compared to presently available crash barriers and crash cushions. Reducing the weight of the truck mounted attenuators reduces the jolt during initial impact and provides better protection for an impacting vehicle by transferring more energy to the energy absorbing elements.

A truck mounted attenuator having a cutter plate and energy absorbing elements incorporating teachings of the present invention may be satisfactorily used during harsh weather conditions and is not sensitive to cold or moisture. A cutter plate and energy absorbing elements incorporating teachings of the present invention can absorb large amounts of energy while safely stopping an impacting vehicle during a relatively short length of travel of the energy absorbing elements. For one application, an energy absorbing element is provided with a plurality of cut out portions to safely stop a light weight vehicle with minimum damage to the vehicles during initial impact.

The cutter plate and energy absorbing elements cooperate with each other to eliminate many of the problems associated with prior truck mounted attenuator designs. A truck mounted attenuator incorporating teachings of the present invention can satisfactorily dissipate kinetic energy of an impacting vehicle weighing 4,500 pounds at speeds of over sixty miles per hour (60 mph) with minimal damage to the vehicle and no debris from the truck mounted attenuator. A truck mounted attenuator incorporating teachings of the present invention provides highly predictable deceleration of an impacting vehicle. The truck mounted attenuator may be easily mounted on and removed from a wide variety of highway service vehicles and maintenance vehicles.

In addition to eliminating problems associated with prior truck mounted attenuator designs, the present invention provides a truck mounted attenuator offering a higher level of protection to the motoring public with greater improved reliability and reduced costs. The resulting truck mounted attenuator provides appropriate deceleration or stopping force for a wide range of vehicle sizes and types including vehicles weighing between 820 kilograms and 2,000 kilograms.

In accordance with a further aspect of the present invention, a truck mounted attenuator is provided having two main components, a bracket assembly and an impact attenuator. The bracket assembly may be mounted on the rear of a highway service vehicle and held in position by two or more breakaway struts. The impact attenuator preferably consists of two energy absorbing assemblies (sometimes referred to as main beams) which are connected with each other by an impact plate and a series of cross braces. As a result of connecting the two energy absorbing assemblies with each other by the series of cross braces and the impact plate, the impact attenuator has a rigid frame construction which will be better able to absorb energy from a vehicle collision which is offset from the center of the impact plate. This same rigid frame construction should allow the impact attenuator to better absorb energy from vehicles that collide with the impact plate at an angle other than perpendicular to the impact plate.

Each energy absorbing assembly preferably contains two C-channels with the C shaped configurations facing each other and the C-channels extending generally horizontally in the direction of oncoming vehicle traffic during normal operation of the truck mounted attenuator. A gap of approximately one inch is provided between opposing flanges of the two C-channels. This gap may be covered by one or more metal plates or energy absorbing elements to form a closed box type structure. One end of each energy absorbing assembly slides into a respective cutter or ripper assembly which is attached to and forms the lower portion of the bracket assembly. During impact between a motor vehicle and the impact plate, the forces of the collision are transferred from the energy absorbing assemblies to the bracket assembly causing the breakaway struts to release the bracket assembly from its initial, first position extending from the rear of the highway support vehicle. The bracket assembly can then rotate downward to its second position which allows portions of the impact attenuator to slide safely under the highway service vehicle. As the energy absorbing assemblies of the impact attenuator move forward toward the highway service vehicle, the metal plates or energy absorbing elements which are attached on opposite sides of the C-channels are cut or ripped by the respective cutter assembly. Supporting beams having configurations other than C-channels may be satisfactorily used with the present invention. The energy of the impacting vehicle is dissipated and the impacting vehicle brought safely to rest by the force required to cut the metal plates of the energy absorbing assemblies. Various combinations of metal plates and supporting beams may be used to form each energy absorbing assembly to provide appropriate stopping or deceleration for a wide range of vehicle types, weights and speeds of impact.

Technical advantages of the present invention include providing a relatively low cost, light weight truck mounted attenuator with reliable, predictable performance characteristics which are not affected by weather conditions. A truck mounted attenuator incorporating teachings of the present invention may be easily installed, operated and maintained. Easily replaceable parts allow for quick, low cost repair after nuisance hits or damage caused by operator error. Elimination of easily crushed or easily bent materials further minimizes the effect of any damage from nuisance hits or operator error.

BRIEF DESCRIPTION OF THE DRAWINGS

A more complete understanding of the present invention may be acquired by referring to the following description taken in conjunction with the accompanying drawings in which like reference numbers indicate like features and wherein:

FIG. 2 is a schematic drawing showing an isometric view with portions broken away of the highway service vehicle and energy absorbing system of FIG. 1 with the flexible cover removed;

FIG. 3 is a schematic drawing showing an isometric view with portions broken away showing the highway service vehicle and energy absorbing system of FIG. 1 with the impact attenuator in its third, out-of-service position;

FIG. 4 is a schematic drawing in elevation with portions broken away showing an initial impact between an automobile and the highway service vehicle of FIG. 2 with the impact attenuator in its first position;

FIG. 5 is a schematic drawing in elevation with portions broken away shortly after the initial impact of FIG. 4 showing the impact attenuator intermediate its first position and its second position;

FIG. 6 is a schematic drawing in elevation with portions broken away showing the energy absorbing system of FIG. 2 with the impact attenuator in its second position after one or more energy absorbing elements having been sheared as a result of dissipating energy from the impacted by the automobile;

FIG. 7A is a schematic drawing showing an isometric view with portions broken away of a cutter plate and an energy absorbing assembly having a plurality of energy absorbing elements and supporting beams in accordance with teachings of one aspect of the present invention;

FIG. 7B is a schematic drawing in section with portions broken away taken along lines 7B—7B of FIG. 7A showing the box beam type cross section of the energy absorbing assembly;

FIG. 8 is a schematic drawing showing an isometric view with portions broken away of the energy absorbing assembly of FIGS. 7A and 7B after the energy absorbing elements have been cut or ripped while absorbing energy from a vehicle collision;

FIG. 9 is a schematic drawing in elevation with portions broken away showing various details of the energy absorbing system of FIG. 2, including a bracket assembly which may be mounted on the rear portion of a highway service vehicle and the associated impact attenuator in their first position;

FIG. 10 is a schematic drawing in elevation with portions broken away taken along lines 10—10 of FIG. 9 showing a front view of the bracket assembly with one of the cutter plates extending generally horizontally and another cutter plate rotated approximately ninety degrees to a generally vertical position;

FIG. 11 is a schematic drawing showing a plan view with portions broken away of the impact attenuator of FIG. 9;

FIG. 12 is a schematic drawing in elevation with portions broken away showing an impact plate mounted on one end of the impact attenuator of FIG. 9 opposite from the bracket assembly;

FIG. 20 is an exploded schematic drawing showing an isometric view with portions broken of still another embodiment of the present invention in which the energy absorbing assembly includes a plurality of progressively thicker energy absorbing elements or metal plates along the length of the associated energy absorbing assembly selected to stop an impacting automobile with a gradually increasing deceleration or stopping force applied to the impacting automobile;

FIG. 21 is a schematic drawing showing an isometric view with portions broken away of an energy absorbing element having a plurality of cutouts disposed therein to minimize damage to a light weight motor vehicle during initial impact with an energy absorbing assembly having such energy absorbing elements; and FIG. 22 is a schematic drawing with portions broken away of a cutter or ripper assembly which may be pivotally installed as part of the bracket assembly shown in FIGS. 2, 3, 10, 13A and 13B.

DETAILED DESCRIPTION OF THE INVENTION

The present invention and its advantages are best understood by referring to FIGS. 1–22 of the drawings, like numerals being used for like and corresponding parts of the drawings.

Figure 13A:
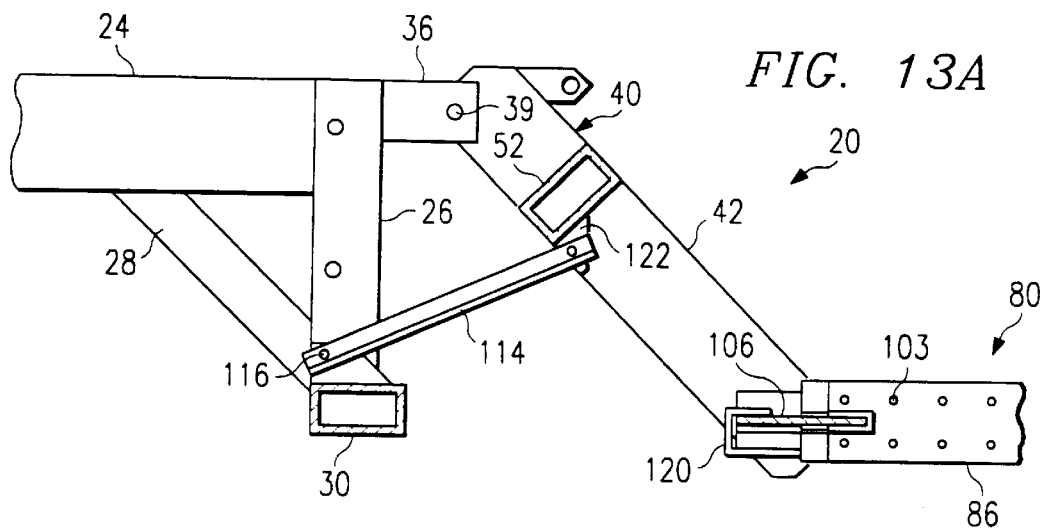
FIG. 13A is a schematic drawing in elevation with portions broken away showing portions of the bracket assembly and the impact attenuator of FIG. 9 in their first position.
Figure 13B:
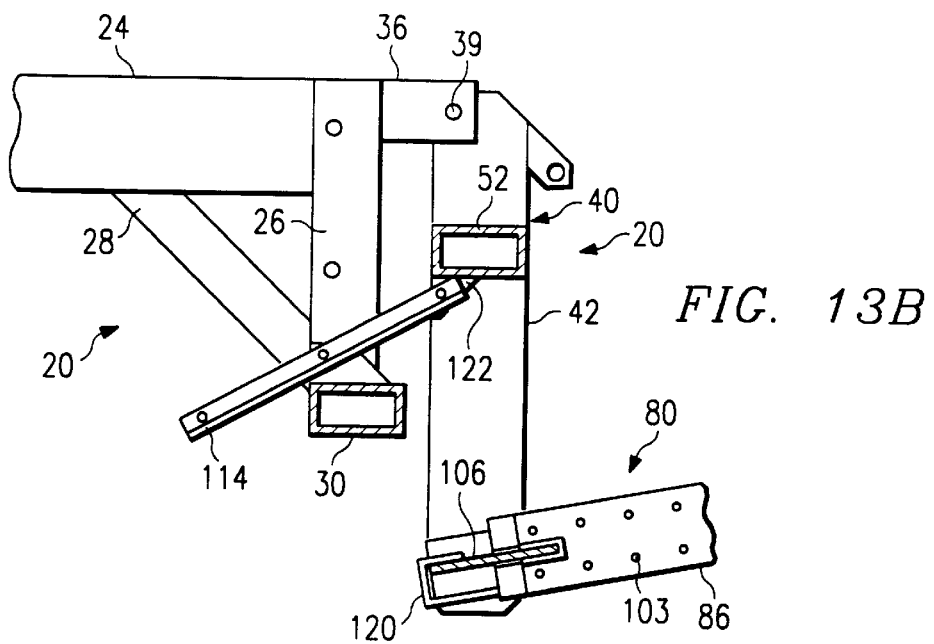
FIG. 13B is a schematic drawing in elevation with portions broken away showing portions of the bracket assembly and impact attenuator of FIG. 9 in their second position.

Energy absorbing system 20 is shown in FIGS. 1–6 mounted on the rear portion of highway service vehicle or truck 22. Portions of energy absorbing system 20 and highway service vehicle 22 are also shown in FIGS. 9, 13A and 13B. Various components of energy absorbing system 20 are shown in FIGS. 7A, 7B, 8, 10, 11, and 12. Energy absorbing system 20 includes bracket assembly 40 and impact attenuator 80. Energy absorbing system 20 may sometimes be referred to as a truck mounted attenuator. Impact attenuator 80 may sometimes be referred to as a sliding frame assembly.

Figure 1:
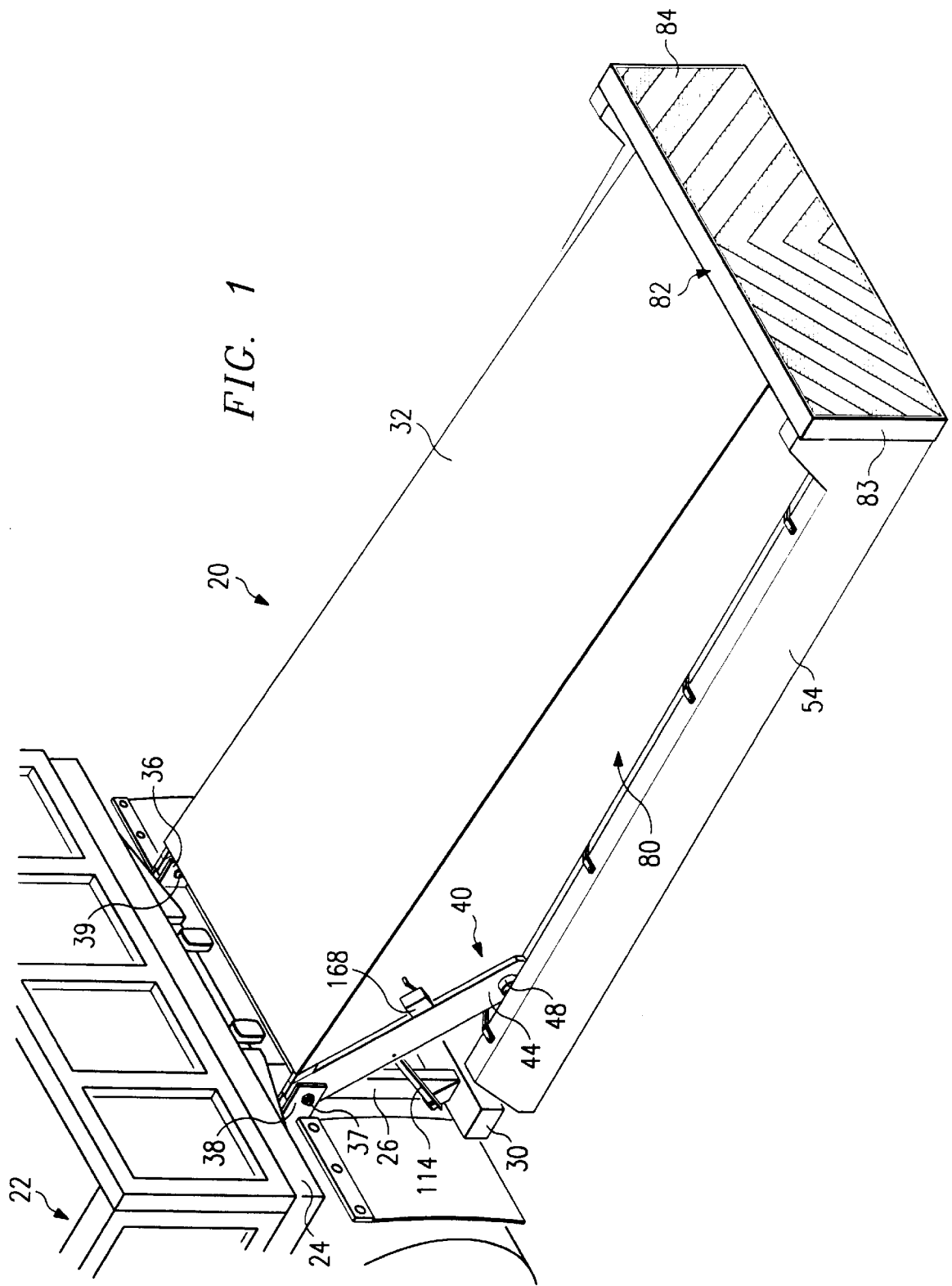
FIG. 1 is a schematic drawing showing an isometric view with portions broken away of a highway service vehicle having an energy absorbing system mounted thereon with a flexible cover extending over portions of an impact attenuator or sliding frame assembly incorporating teachings of the present invention.

Flexible cover 32 is shown in FIG. 1 extending over the exterior of impact attenuator 80. Flexible cover 32 may be formed from various types of fabrics and/or plastic materials depending upon the intended application for energy absorbing system 20. Also, energy absorbing system 20 may be satisfactorily used without flexible cover 32 as shown in FIGS. 2–6.

For some applications it may be desirable to included various lighting systems as part of energy absorbing system 20. The lighting system may include side lights, running lights, warning lights, turn signals and/or stop lights as appropriate. The lighting system may be attached to flexible cover 32 or other components of energy absorbing system 20 such as impact fence or impact plate 82. Examples of such lighting systems will be discussed later in more detail with respect to FIGS. 10 and 12.

Chevron delineators 84 are preferably visible when energy absorbing system 20 is in its first position or operating position as shown in FIG. 1. Chevron delineators 84 are also preferably visible when energy absorbing system 20 is in its third position or out-of-service position as shown in FIG. 3. Chevron delineators 84 are placed on the portion of impact fence 82 facing oncoming traffic when impact attenuator 80 is in its first position. Chevron delineators 84 are placed on the portion of bottom-plate 126 which faces oncoming traffic when impact attenuator 80 is in its third, out-of-service position.

For purposes of illustration, highway service vehicle 22 is shown with the general configuration associated with a typical dump truck. However, an energy absorbing system incorporating teachings of the present invention may be used on a wide variety of highway service vehicles and maintenance vehicles and is not limited to use with truck 22 as shown in FIGS. 1 through 6. The present invention allows fabrication of an energy absorbing system having one or more cutter plates and associated energy absorbing assemblies with one or more energy absorbing elements slidably disposed adjacent to the respective cutter plate as appropriate for the roadway hazard that will be protected by the energy absorbing system.

For the embodiment of the present invention shown in FIGS. 1–6, highway service vehicle 22 preferably includes truck frame 24 with two sets of supporting struts 26 and 28 used to attach bumper 30 to the rear portion of highway service vehicle 22. Bracket assembly 40 is preferably used to rotatably and slidably mount impact attenuator 80 on the rear portion of highway service vehicle 22 adjacent to bumper 30.

As best shown in FIGS. 1, 2 and 4, bracket assembly 40 releasably holds impact attenuator 80 in its first position extending generally horizontally from bumper 30 of highway service vehicle 22 at a first vertical distance above roadway 34. When relatively fast moving motor vehicle 136 contacts or collides with impact fence or plate 82, bracket assembly 40 will allow impact attenuator 80 to rotate or move to its second position as shown in FIG. 6. In the second position, impact attenuator 80 extends generally horizontally from bumper 30 at a second, lower vertical distance above roadway 34.

An appropriately sized pair of chains, wire cables, or straps 50 preferably extends from bracket assembly 40 to impact fence 82. Chains 50 provide support for the extreme end of impact attenuator 80 opposite from bracket assembly 40. For purposes of illustration only, a single chain 50 is shown in FIGS. 4, 5 and 6. Turnbuckle 142 as shown in FIG. 9 may be included as part of each chain 50 to allow adjusting the height of impact attenuator 80 above roadway 34 when impact attenuator 80 is in its first position.

As best shown in FIGS. 2 and 4, when bracket assembly 40 and impact attenuator 80 are in their first position, tension is placed on chains 50 to hold impact attenuator 80 substantially parallel with roadway 34. As shown in FIGS. 5 and 6, when motor vehicle 136 collides with impact fence 82, chains 50 are sufficiently flexible to allow movement of impact attenuator 80 relative to bracket assembly 40 and frame 24 of highway service vehicle 22.

Electric winch 60, along with strap 76, may also be attached to bracket assembly 40 or truck frame 24 for use in raising and lowering impact attenuator 80 and to allow adjustments in the length of chains 50. Electric winch 60 and strap 76 may also be used to rotate impact attenuator 80 from its first, generally horizontal position shown in FIG. 1 to its third, generally vertical or upright position as shown in FIG. 3. Electric winch 60 and strap 76 are components of hoist assembly 230 which will be discussed later in more detail.

The third position for impact attenuator 80 is appropriate for relatively high speed travel of truck 22 when energy absorbing system 20 is not required or when truck 22 is parked out-of-service. As discussed later in more detail, cutter plates 106 and 108 can preferably pivot relative to bracket assembly 40 to allow movement of impact attenuator 80 between its first, generally horizontal position, its second, generally horizontal position, and its third, generally vertical position. A particular advantage of including electric winch 60 is elimination of potential environmental hazards associated with spills or leaks from a hydraulic fluid system. Also, electric winch 60 may be remotely operated from the cab (not expressly shown) of truck 22 or any other desired location.

Bracket assembly 40 preferably includes a pair of heavy support arms 42 and 44. A pair of tabs 36 are preferably attached to frame 24 at the rear portion of truck 22 for use in rotatably securing one end of support arms 42 to frame 24. A second pair of tabs 38 are preferably attached to frame 24 at the rear portion of truck 22 for use in rotatably securing one end of support arm 44 to frame 24. Each pair of tabs 36 and 38 are spaced from each other to receive the respective end of support arms 42 and 44 therebetween. Bolts or pins 37 and 39 extend through the respective pairs of tabs 36 and 38 and the respective ends of support arms 42 and 44 to allow limited rotational movement of support arms 42 and 44 relative to the rear portion of truck 22. The size of tabs 36 and 38 along with bolts 37 and 39 are selected to insure that bracket assembly 40 will remain securely attached to truck frame 24 following impact by motor vehicle 136.

Pivot assemblies 46 and 48 are provided at the end of support arms 42 and 44 opposite from respective tabs 36 and 38. Pivot assemblies 46 and 48 cooperate with each other to allow impact attenuator 80 to remain approximately parallel with roadway 34 during movement of bracket assembly 40 and impact attenuator 80 from their first position as shown in FIG. 1 to their second position as shown in FIG. 6. Pivot assemblies 46 and 48 also allow impact attenuator 80 to rotate from its first, horizontal position as shown in FIG. 1 to its third, vertical position as shown in FIG. 3 when energy absorbing system 20 is not required such as during travel of highway truck 22 on roadway 34 at normal speeds.

Impact attenuator 80 preferably includes a pair of energy absorbing assemblies 86 and 88 which are slidably coupled with bracket assembly 40. Energy absorbing assemblies 86 and 88 may also be referred to as box beams. For the embodiment of the present invention represented by impact attenuator 80, energy absorbing assemblies 86 and 88 are substantially identical. Therefore, only energy absorbing assembly 86 shown in FIGS. 7A, 7B and 8 will be described in detail.

Energy absorbing assembly 86 preferably includes a pair of supporting beams 90 which are disposed longitudinally parallel with each other and are spaced laterally from each other. Supporting beams 90 have a generally C-shaped or U-shaped cross section. The C-shaped cross section of each supporting beam 90 are disposed facing each other to define a generally rectangular cross section for energy absorbing assembly 86. Supporting beams 90 may also be described as channels. The C-shaped cross section of each support beam 90 is defined in part by web 92 and grips or flanges 94 and 96 extending therefrom. A plurality of matching holes 98 are preferably formed in both grips 94 and 96 for use in attaching energy absorbing elements 100 to opposite sides of energy absorbing assembly 86.

For the embodiment shown in FIGS. 7A, 7B and 8, a pair of energy absorbing elements 100 are attached to grips 94 on one side of energy absorbing assembly 86. Another pair of energy absorbing elements 100 are attached to grips 96 on the opposite side of energy absorbing assembly 86. Spacers 104 are preferably disposed between each pair of energy absorbing elements 100 adjacent to the respective grips 94 and 96. A plurality of fasteners 103 extend through holes 98 in grips 94 and 96 and the associated energy absorbing elements 100. For the embodiment of the present invention shown in FIGS. 7A, 7B and 8, energy absorbing elements 100 have a relatively uniform thickness. For some applications it may be desirable to vary the thickness and/or number of energy absorbing elements 100 along the length of energy absorbing assembly 86 as discussed later in more detail with respect to energy absorbing assembly 486 shown in FIG. 20.

Energy absorbing assembly 86 includes a pair of supporting beams 90 which are spaced laterally from each other with a pair of energy absorbing elements 100 attached to respective opposite sides of energy absorbing assembly 86 with a gap defined by spacers 104 between adjacent energy absorbing elements 100. Fasteners 103 allow for easy replacement of energy absorbing elements 100 after collision of a motor vehicle with impact plate 82. A wide variety of fasteners may be satisfactorily used to attach energy absorbing elements 100 with supporting beams 90.

For the embodiment of the present invention shown in FIGS. 7A, 7B and 8, energy absorbing elements 100 may be formed from various types of metal alloys. For some applications, mild steel is preferred. The number of energy absorbing elements 100 and their length and thickness may be varied depending upon the intended application for the resulting energy absorbing assembly. Increasing the number of energy absorbing elements, increasing their thickness, and/or increasing the length of energy absorbing elements 100, will allow the resulting energy absorbing assembly to dissipate an increased amount of kinetic energy. Energy absorbing elements 100 may also be referred to as rip plates or shear plates. Benefits of the present invention include the ability to vary the geometric configuration and number of energy absorbing elements 100 and to select appropriate metal alloys depending upon the intended application for the resulting energy absorbing system.

Bracket assembly 40 includes a pair of cutter plates 106 and 108 which are attached to respective support arms 42 and 44 by associated pivot assemblies 46 and 48. For the embodiment of the present invention as shown in FIGS. 2 and 10, bracket assembly 40 includes support arm 142 which is laterally spaced from support arm 42 and support arm 144 which is laterally spaced from support arm 44. Tube 52 preferably extends between support arms 42 and 44 with one end of each support arm 142 and 144 attached thereto. Pivot assembly 46 includes cutter plate 106 and pivot assembly 48 includes cutter plate 108. Cutter plates 106 and 108 may also sometimes be referred to as "ripper plates." Pivot assembly 48 and its associated cutter plate 108 are shown in more detail in FIG. 22.

One end of each energy absorbing assembly 86 and 88 is preferably slidably mounted relative to respective cutter plates 106 and 108. The other end of each energy absorbing assembly 86 and 88 is secured to impact fence 82. For the embodiment shown in FIG. 7A, cutter plate 106 includes a pair of beveled cutting edges or ripping edges 107 and 109 which are disposed at first end 101 of each energy absorbing element 100. The thickness of cutter plates 106 and the lateral spacing or gap 118 between supporting beams 90 are selected to allow cutter plate 106 to fit between grips 94 and 96 and the adjacent supporting beams 90. Cutter plate 108 is similar to cutter plate 106.

Slots 102 are preferably formed in the first end of each energy absorbing element 100 adjacent to cutter plates 106 and 108. Cutting edges 107 and 109 are preferably disposed at an acute angle relative to energy absorbing elements 100. Cutting edges 107 and 109 may also be described as rip blades. For the embodiment shown in FIG. 7A, cutting edges 107 and 109 are hardened and formed at an angle of approximately forty-five degrees relative to the associated energy absorbing elements 100. The configuration of cutting edges 107 and 109, including their orientation relative to energy absorbing elements 100, is selected to cause the associated energy absorbing elements 100 to fail in tension as they are stretched between the respective grips 94 and 96 of the associated support beams 90.

Retainer straps 120, as shown in FIGS. 7A, 9, 13A and 13B may also be provided releasably secure energy absorbing assemblies 86 and 88 with respective cutter plates 106 and 108. If chains 150 should fail when impact attenuator 80 is in its first, extended position, retainer straps 120 will maintain energy absorbing assemblies 86 and 88 attached to bracket assembly 40 via respective cutter plates 106 and 108.

Energy absorbing elements 100 are preferably galvanized to insure that they retain their desired tensile strength and are not affected by environmental conditions which could cause rust or corrosion during the life of the associated energy absorbing system 20. The specific dimensions of cutting edges 107 and 109, along with their angular relationship relative to energy absorbing elements 100, may be varied depending upon the amount of kinetic energy which will be dissipated by the resulting energy absorbing assembly 86 and 88.

Various types of mechanisms such as detents, collets, shear pins and breakaway connections may be satisfactorily used to releasably hold bracket assembly 40 in its first position. For the embodiment of the present invention shown in FIGS. 1–6, 9, 13A and 13B, a pair of breakaway struts 114 and associated breakaway tabs 122 and 124 are used to releasably hold bracket assembly 40 in its first position with impact attenuator 80 extending generally horizontally from highway service vehicle 22. For the embodiment of FIGS. 1–6, 9, 13A and 13B, breakaway struts 114 are shown formed from conventional angle iron. For some applications, breakaway struts 114 are preferably formed from solid bar stock.

One end of each breakaway strut 114 may be attached to rectangular tube 52 adjacent to support arms 42 and 44 by respective breakaway tabs 122 and 124. The opposite end of each breakaway strut 114 is preferably attached to bumper assembly 30 and/or supporting strut 26 by shear bolt 116. The number and configuration of breakaway struts 114 may be varied depending upon the intended application for the resulting energy absorbing system 20.

When motor vehicle 136 collides with or contacts impact fence 82, the initial force of the collision or impact is transmitted via energy absorbing assemblies 86 and 88, cutters 106 and 108, support arms 42 and 44, rectangular tube 52, and breakaway struts 114 to respective shear bolts 116. Various types and sizes of shear bolts 116 may be installed between breakaway struts 114 and the respective attachment with truck frame 24, depending upon the intended application for impact attenuator 80.

For some nuisance type hits or impacts, the only damage occurring to energy absorbing system 20 will typically be the shearing of bolts 116 and the rotation of impact attenuator 80 from its first position to its second position. For one embodiment of the present invention most impacts under five miles per hour generally resulted in only the movement of impact attenuator 80 from its first position to its second position. Following such nuisance hits, energy absorbing system 20 may be restored by simply reinstalling new shear bolts 116 to releasably hold impact attenuator 80 in its first position.

For relatively low speed impacts, such as between approximately five miles per hour and eighteen miles per hour or higher, one or more relatively short lengths of energy absorbing elements 100 may be installed immediately adjacent to cutter plates 106 and 108. Thus, following a low speed impact only these relatively short lengths of energy absorbing elements 100 will require replacement which substantially simplifies repair and maintenance of energy absorbing system 20.

After bolts 116 have been sheared, kinetic energy from motor vehicle 136 will cause bracket assembly 40 and impact attenuator 80 to move from their first position as shown in FIGS. 1, 2, 9 and 13A to their respective second position as shown in FIG. 13B. When bracket assembly 40 is in its second position, support arms 42, 142, 44 and 144 preferably contact bumper 30 to prevent any further movement of bracket assembly 40 relative to truck frame 24. The length of support arms 42, 142, 44 and 144 is selected to position energy absorbing assemblies 86 and 88 of impact attenuator 80 below bumper 30 and other components of truck 22 such that energy absorbing assemblies 86 and 88 may slide longitudinally under truck 22 as shown in FIG. 6. As impact attenuator 80 slides longitudinally through bracket assembly 40, the kinetic energy of impacting vehicle 136 is dissipated through cutting or ripping of energy absorbing elements 100 by cutter plates 106 and 108 as shown, for example, in FIGS. 6 and 8.

For the embodiment shown in FIGS. 9 and 12, the second end of impact attenuator 80 opposite from bracket assembly 40 preferably includes impact fence 82 having plastic nose cover 83 with reflective chevron delineations 84 formed thereon. Impact fence 82 may include metal support or C-channel 78 which extends laterally between energy absorbing assemblies 86 and 88. A pair of metal tubes 74 extend upwardly from C-channel 78 and are connected with each other by C-channel 72. Metal braces 70 are disposed between energy absorbing assemblies 86 and 88 to support for impact fence 82. For some applications, impact fence 82 may be replaced by a metal plate and sometimes referred to as an "impact plate."

During a collision between a motor vehicle and impact fence 82, the kinetic energy of the colliding vehicle is transferred through metal support 78 and metal braces 70 to energy absorbing assemblies 86 and 88. The kinetic energy or force of the impact is then transferred from energy absorbing assemblies 86 and 88 to bracket assembly 40 and is dissipated.

As previously noted, plastic nose cover 83 may be installed on the portion of impact fence 82 facing oncoming traffic. Plastic nose cover 83 is shown in dotted lines in FIGS. 9 and 12. For some applications, it may also be desirable to install plastic side boards 54 and 56 extending along opposite sides of impact attenuator 80. For the embodiment shown in FIGS. 1, 2 and 3, plastic side boards 54 and 56 extend longitudinally from bumper 30 to impact fence 82. In FIGS. 2 and 9, plastic side board 54 is shown in dotted lines. In FIG. 9, plastic side board 54 is shown in dotted lines having a length which is approximately equal to the length of energy absorbing assembly 88.

Side boards 54 and 56 are preferably formed from lightweight plastic material. Sideboards 54 and 56 may be attached to respective energy absorbing assemblies 86 and 88 to provide an pleasing aesthetic appearance. As best shown in FIG. 2, a plurality of metal straps 55 may be used to releasably attach sideboards 54 and 56 with their respective energy absorbing assembly 86 and 88. Metal straps 55 are designed to allow easy replacement of the associated sideboards 54 and 56 if damaged during a vehicle collision.

Pivot assembly 48 is shown in FIGS. 10 and 22 in its generally horizontal position. For purposes of illustration, pivot assembly 46 is shown in FIG. 10 in its generally vertical position. In actual use, pivot assemblies 46 and 48 are generally both in their horizontal position or in their vertical position.

Since pivot assemblies 46 and 48 are substantially identical, only pivot assembly 48 will be described in detail. Relatively short pieces of cylindrical tubing or pipe extend laterally from opposite sides of cutter plate 108 to form rotating shafts or pivot shafts 62 and 64. For some applications, pivot shafts 62 and 64 are preferably formed from round, solid bar stock. Pivot shafts 62 and 64 are preferably sized to fit within corresponding openings in hold down assembly 510 and respective support arms 44 and 144. Pivot shaft 62 is preferably longer than pivot shaft 64 to allow engagement with side jack 250.

Each pivot assembly 46 and 48 preferably includes a respective hold down assembly 510 which will be described later in more detail. Appropriately sized bushings (not expressly shown) are preferably disposed adjacent to the ends of support arms 42, 142, 44, and 144 to allow pivot respective assemblies 46 and 48 to rotate between their horizontal and vertical positions as best shown in FIG. 10. This pivoting connection is provided to allow impact attenuator 80 to remain approximately horizontal during movement of bracket assembly 40 from its first position to its second position. Also, the pivoting connection provided between pivot assemblies 46 and 48 and respective supporting arms 42 and 142 and supporting arms 44 and 144 allow impact attenuator 80 to rotate from its first generally horizontal position to its third generally vertical position.

As best shown in FIG. 10, cutter plates 106 and 108 preferably includes a respective guide plate 68. The width of each guide plate 68 is selected to be compatible with the width of supporting beams 90. The combined thickness of each cutter plate 106 and 108 along with its respective guide plate 68 is selected to be compatible with gap 118 formed between respective support beams 90. The thickness of each cutting plate 106 and 108 is selected to correspond generally with the dimensions of slot 102. Each guide plate 68 is preferably disposed within the generally C-shaped channel defined by web 92 and flanges 94 and 96 of the associated support beams 90.

Substantially identical hold down assemblies or push down assemblies 510 are preferably disposed adjacent to each cutter plate 106 and 108. Examples of such hold down assemblies 510 are shown in FIGS. 2, 9 and 10. Hold down assemblies 510 are not shown in FIGS. 13A and 13B for purposes of illustrating other features of the invention.

As shown in FIG. 9, hold down assembly 510 includes a generally U-shaped structure having top plate 514 with opposite side plates 516 and 518 extending therefrom. The dimensions of hold down struts 510 are selected to allow rotation within bracket assembly 40 when bracket assembly 40 is in its first position.

As best shown in FIGS. 2 and 9, a generally triangular shaped strut 520 is preferably attached to upper plate 514. Triangular shaped strut 520 includes three arms 524, 526 and 528. Arms 524 and 528 are joined with each other at location 530. Pad and guide shoe or skid 534 are formed at the end of triangular strut 520 spaced longitudinally from U-shape structure 512 and the associated cutter plate 106 and 108.

The dimensions of pad and skid 534 are selected to correspond generally with web 92 of channels 90. When a vehicle collides with impact fence 82, bolt 16 will shear releasing breakaway strut 114 from bumper 30 and allow bracket assembly 40 to move to its second position. The dimensions of arms 526 are selected such that when bracket assembly 40 is in its second position, arms 526 will normally engage bumper 30 to prevent any rotation of the associated hold down assemblies 510 and the respective cutter plates 106 and 108.

The amount of kinetic energy required to shear bolts 116 is selected to be much lower than the amount of energy necessary to shear the initial stages of energy absorbing elements 100. Thus, bracket assembly 40 will be in its second position with support arms 42, 142, 44 and 144 along with supports 526 fully engaged with bumper 30 before cutter plates 106 and 108 engage energy absorbing elements 100 associated with respective energy absorbing assemblies 86 and 88.

For some applications, gap or cutting zone 118 between supporting beams 90 may be approximately one inch and the thickness of cutter plates 106 and 108 may be approximately one half inch. As impact attenuator 80 slides longitudinally through bracket assembly 40, each skid 534 contact respective supporting beams 90 to maintain the desired alignment of the respective energy absorbing assemblies 86 and 88 with their respective cutter plates 106 and 104. For some applications, the lateral spacing between support arms 42 and 44 may be approximately 46 inches.

During a collision with impact fence 82 of truck mounted attenuator 20, a vehicle will experience an initial jolt as bolts 116 shear and breakaway struts 114 allow bracket assembly 40 to move from its first position to its second position. A deceleration spike will then occur as momentum is transferred from the vehicle to impact attenuator 80 which results in impact attenuator 80 and the vehicle moving in unison with each other. The amount of deceleration due to the momentum transfer is a function of the weight of impact attenuator 80, along with the weight and initial speed of the vehicle. This deceleration allows a decrease in the length of energy absorbing assemblies 86 and 88 required to safely absorb the kinetic energy of an impacting vehicle. As impact attenuator 80 slides forward, cutter plates 106 and 108 engage progressively thicker energy absorbing elements of the respective energy absorbing assemblies 86 and 88. As previously noted, the thickness and number of energy absorbing elements may be varied to safely absorb the kinetic energy from a wide range of vehicle types, sizes and/or speeds of impact.

For some applications, lights 170 and 172 are preferably mounted on bracket assembly 40 and lights 174 and 176 mounted on impact fence 82. When impact attenuator 80 is in its first position lights 74 and 76 will generally be visible to oncoming traffic. When impact attenuator 80 is in its third position, lights 170 and 172 will generally be visible to oncoming traffic.

The dimensions of impact fence 82 which are defined in part by supports 72, 74 and 76 are selected to catch or gather an impacting vehicle and to transmit the force of collision onto energy absorbing assemblies 86 and 84. The dimensions of impact fence 82 may also be selected to aid the transfer of energy to energy absorbing assemblies 86 and 88 from vehicles which collide with impact fence 82 at an angle other than perpendicular.

As shown in FIGS. 2 and 11, energy absorbing assemblies 86 and 88 are preferably secured to each other by a plurality of cross braces 530. Cooperation between impact fence 82, cross braces 530 and energy absorbing assemblies 86 and 88 result in impact attenuator 80 having a very rigid frame structure. Guide plates 68 cooperate with each other and the associated supporting beam 90 to maintain the desired alignment between impact attenuator 80 and cutter plates 106 and 108. As a result, impact attenuator 80 is better able to safely absorb the impact from a motor vehicle that strikes impact fence 82 either offset from the center of impact fence 82 or that strikes impact fence 82 at an angle other than parallel with energy absorbing assemblies 86 and 88.

For some applications such as shown in FIGS. 2 and 9, latch assembly 150 may be provided as part of bracket assembly 40. Latch assembly 150 may be used to releasably lock impact attenuator 80 in its third, out-of-service position. For the embodiment shown in FIGS. 2 and 9, latch assembly 150 preferably includes latch support 152 with latch bar pivotally attach thereto. For this embodiment, spring 156 is connected with latch bar 154 and an adjacent portion of bracket assembly 40 to maintain latch bar 154 in its first position. Handle 158 is preferably provided on the end of latch bar 154 adjacent to latch support 152 for use in pivoting or rotating latch bar 154 from its first position to its second position (not expressly shown).

Notch 160 is preferably formed adjacent to the end of latch bar 154 opposite from latch supports 152. The dimensions of notch 160 are selected to be compatible with the dimensions of cross bar 162 which preferably extends laterally between energy absorbing assemblies 86 and 88. Tapered surface 164 is preferably formed between notch 160 and the extreme end of latch bar 154. The dimensions of tapered surface 164, cross bar 162 and notch 160 are selected to be compatible with each other such that when winch 60 and strap 76 raise impact attenuator 80 from its first position to its third position, cross bar 162 will be engaged with notch 160. Notch 160 and cross bar 162 cooperate with each other to positively lock impact attenuator 80 in its third position.

For some applications, latch bar 154 may be temporarily secured in its second (unlatch) position so that impact attenuator 80 may be raised and lowered between its first and third positions without engaging cross bar 162 in notch 160. Also, for some applications, notch 160 may preferably be formed with only shoulder 161. Shoulder 163 may not be required for all applications.

For some applications, one or more rubber bumpers 166 may be mounted on bracket assembly 40. When impact attenuator 80 is placed in its third position, rubber bumper 166 will be compressed. When a handle 158 rotate latch bar 154 to its second position which releases cross bar 162 from notch 160, rubber bumper 166 will then apply force to impact attenuator 80 which will tend to cause impact attenuator 80 to move from its third position to its first position. For some applications, rubber bumper 166 may be dense, polyester tube extending laterally across portions of bracket assembly 40. For other applications, rubber bumper 166 may preferably be replaced by one or more coiled springs.

Proximity switch or kill switch 168 is also preferably mounted on bracket assembly 40. As impact attenuator 80 moves to its desired third position, portions of energy absorbing assembly 86 and/or 88 will contact proximity switch 168 to kill or cut off electricity to winch 60.

Energy absorbing assembly 20 preferably includes hoist assembly 230 which may be used to raise and lower impact attenuator 80 between its first position and its third position. For the embodiment of the present invention as shown in FIGS. 2, 9 and 10, hoist assembly 230 preferably includes electric winch 60 and strap 76. Hoist assembly 230 further includes winch drum 232. One end of strap 76 is preferably wrapped around and secured with winch drum 232. The other end of strap 76 is preferably secured to cross bar 234 as best shown in FIGS. 2 and 11. Cross bar 234 extends laterally between energy absorbing assemblies 86 and 88. For the embodiment shown in FIGS. 2, 9, 10 and 11, strap 76 may be approximately six inches wide and formed from relatively high strength polyester material. For other applications, strap 76 may be replaced by an appropriately sized wire cable or rope. Electrical winch 60 may be operated by control switch 236 disposed adjacent to bracket assembly 40. Alternatively, control switch 236 may be remotely located in the cab of the associated highway service vehicle. As previously noted, proximity switch 168 is also preferably mounted on bracket assembly 40 to stop winch 60 when impact attenuator 80 is in its third position.

A pair of side jacks 250 as shown in FIG. 10 and an end jack 260 as shown in FIG. 12 may be used to assist with installing and removing energy absorbing system 20 from highway service vehicle 22. Side jacks 250 preferably include handle 252 which may be used to raise and lower the position of main body 258 and mounting plate 254 relative to wheel 256. Mounting plate 254 may be releasably attached by bolts or other suitable fasteners with respective jack attachment plates 251. Each jack plate 251 preferably has an opening formed therein to receive pivot shaft 62 which extends laterally from respective pivot assemblies 46 and 48. As previously noted, pivot shafts 62 may be formed from solid round bar stock. Each jack attachment plate 251 may be welded or otherwise secured to bracket assembly 40 adjacent to respective pivot assemblies 46 and 48.

Impact fence 82 mounted on the second end of impact attenuator 80 includes an appropriately sized connection similar to pivot shaft 62 which may be releasably engaged with end jack 260. Arm 262 may be used to align and engage end jack 260 with the connection (not expressly shown) extending from impact fence 82.

When side jacks 250 are engaged with the respective pivot assemblies 46 and 48 and end jack 260 is engaged with impact fence 82, energy absorbing assembly 20 may be removed from one highway service vehicle 22 and positioned adjacent to another highway service vehicle (not expressly shown) for mounting thereon. Handles 252 and 262 allow raising and lowering the associated jacks 250 and 260. Various types of jacks may be satisfactorily used with energy absorbing system 20. Side jacks 250 and end jack 260 are commercially available from various sources and have been used for moving boat trailers. Handles 252 and 262 operate an associated jack screw which varies the position of the associated connecting plate.

Various types of mechanical fasteners may be satisfactorily used to releasably attach energy absorbing elements 100, 200, and/or 400, 402, 404, 406, 408, 410 and 412 with the associated support beams 90. For some applications, a combination of long bolts and short bolts may be satisfactorily used. For other applications, the mechanical fasteners may be blind threaded rivets and associated nuts. A wide variety of blind rivets, bolts and other fasteners may be satisfactorily used with the present invention. Examples of such fasteners are available from Huck International, Inc., located at 6 Thomas, Irvine, Calif. 92718-2585. Power tools satisfactory for installing such blind rivets are also available from Huck International and other vendors.

Figure 14:
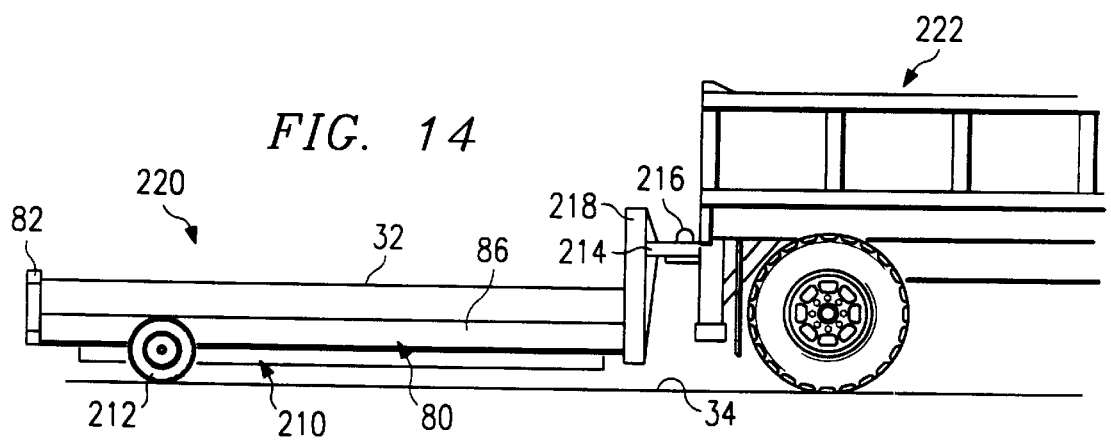
FIG. 14 is a schematic drawing in elevation with portions broken away showing an alternative embodiment of the present invention with an impact attenuator mounted on a trailer coupled to the rear end of a highway service vehicle.

Energy absorbing system 220 incorporating an alternative embodiment of the present invention is shown in FIG. 14. For this embodiment, impact attenuator 80 is mounted on trailer 210 for attachment to the rear portion of highway truck 222. Wheels 212 and other components of trailer 210 are selected to allow energy absorbing assemblies 86 and 88 to slide longitudinally under truck 222 if a motor vehicle collides with or contacts impact plate 82. Front portion 218 of trailer 210 opposite from impact plate 82 includes hitch 214 which may be coupled to a corresponding hitch 216 on the rear portion of truck 222. Trailer 210 maintains impact attenuator 80 at a relatively constant distance above roadway 34 during collision by a motor vehicle.

Cutter plates 106 and 108 (not shown in FIG. 14) are preferably secured to front portion 218 of trailer 210. Coupling 214 cooperates with the rear portion of truck 222 to hold front portion 218 and the corresponding cutter plates 106 and 108 at a fixed position relative to the rear portion of highway truck 222. Kinetic energy from a motor vehicle collision with impact plate 82 is dissipated by impact attenuator 80 as portions of trailer 210 including wheels 212 move forward relative to front portion 218 and cutter plates 106 and 108 to rip or shear energy absorbing elements 100.

Figure 15:
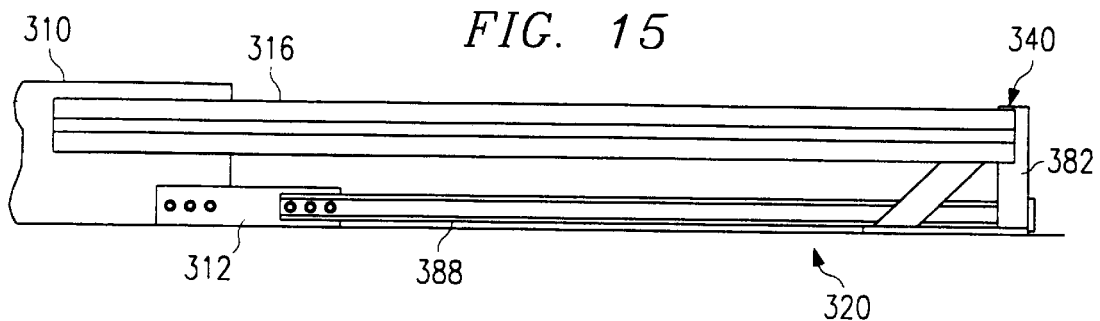
FIG. 15 is a schematic drawing showing an elevational view with portions broken away of an energy absorbing system incorporating teachings of the present invention mounted adjacent to one end of a fixed roadside hazard.
Figure 16:
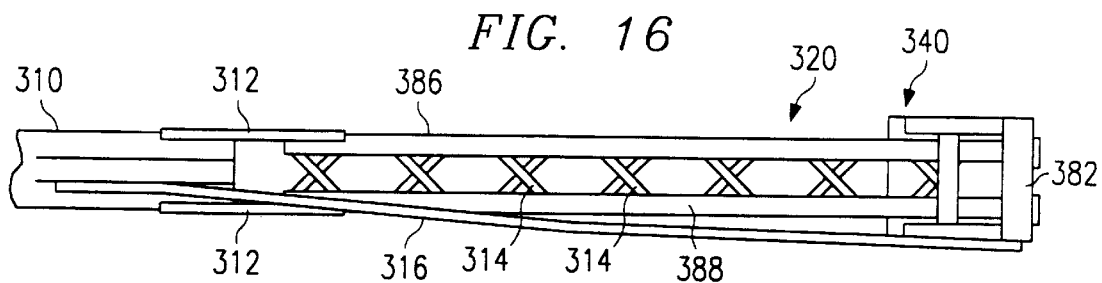
FIG. 16 is a schematic drawing showing a plan view with portions broken away of the fixed roadside hazard and energy absorbing system of FIG. 15.

Energy absorbing system 320 incorporating still another embodiment of the present invention is shown in FIGS. 15 and 16. Energy absorbing system 320 is preferably installed at the end of fixed roadside hazard 310 facing oncoming traffic. For the embodiment shown in FIGS. 15 and 16, fixed roadside hazard 310 may be a concrete barrier extending along the side of a roadway. Energy absorbing system 320 may sometimes be referred to as a crash cushion.

The principal components of energy absorbing system 320 include energy absorbing assemblies 386 and 388. One end of each energy absorbing assembly 386 and 388 is preferably attached to concrete barrier 310 by a pair of struts 312. For some applications energy absorbing assemblies 386 and 388 may also be fixed to the ground in front of concrete barrier 310. A plurality of spacers or cross braces 314 may be used to hold energy absorbing assemblies 386 and 388 aligned longitudinally parallel with each other.

Sled 340 is slidably coupled with the end of energy absorbing assemblies 386 and 388 opposite from concrete barrier 310. A pair of cutter plates 106 and 108 (not shown in FIGS. 10 and 11) are preferably provided as part of sled 340. Cutter plates 106 and 108 are disposed adjacent to the respective energy absorbing elements 100 of energy absorbing assemblies 386 and 388. Energy absorbing assemblies 386 and 388 are essentially the same as previously described for energy absorbing assemblies 86 and 88 of impact attenuator 80.

When a motor vehicle contacts or collides with impact plate 382, sled 340 will move longitudinally relative to energy absorbing assemblies 386 and 388 and concrete barrier 310. As sled 340 moves toward concrete barrier 310, the kinetic energy of the impacting motor vehicle will be dissipated by cutter plates 106 and 108 shearing or ripping the associated energy absorbing elements 100. For some applications it may be desirable to install a section of guardrail 316 between concrete barrier 310 and sled 340 on the side immediately adjacent to the roadway.

Figure 17:
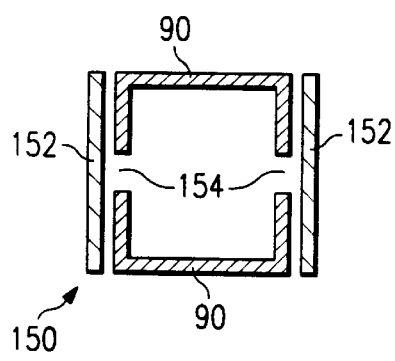
FIG. 17 is a schematic drawing in section with portions broken away showing an energy absorbing assembly incorporating an embodiment of the present invention.
Figure 18:
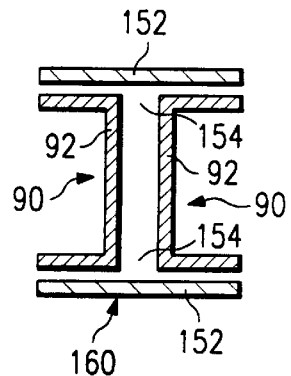
FIG. 18 is a schematic drawing in section with portions broken away showing an energy absorbing assembly incorporating another embodiment of the present invention.
Figure 19:
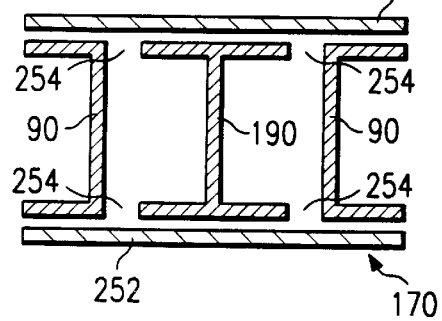
FIG. 19 is a schematic drawing in section with portions broken away showing an energy absorbing assembly incorporating a further embodiment of the present invention.

Energy absorbing assemblies incorporating alternative embodiments of the present invention are shown in FIGS. 17, 18 and 19. The cross section of energy absorbing assembly 150 shown in FIG. 17 includes a pair of supporting beams or channels 90 as previously described for energy absorbing assemblies 86 and 88. Energy absorbing assembly 150 is shown with only two of energy absorbing elements or rip plates 152 disposed on opposite sides thereof. Channels 90 are spaced laterally from each other to define cutting zone or gap 154 therebetween. Energy absorbing elements 152 may be attached to channels 90 using various types of fasteners including bolts 103 as previously described for energy absorbing assemblies 86 and 88. Alternatively, energy absorbing elements 152 may be attached to channels 90 using other types of fasteners such as Huck bolts, rivets, by welding or by various adhesives. One of the main requirements is attaching energy absorbing elements 152 with channels 90 to provide an appropriately sized cutting zone 154 between channels 90 to accommodate the associated cutter plate (not shown).

Energy absorbing assembly 160 shown in FIG. 18 includes substantially the same components as energy absorbing assembly 150 except channels 90 are aligned with the respective C-shaped cross sections facing away from each other. Cutting zones 154 for each energy absorbing element 152 are thus defined by the gap between webs 92 of the respective channels 90.

Energy absorbing assembly 170 is shown in FIG. 19 includes previously described supporting beams or channels 90. In addition, energy absorbing assembly 150 includes supporting beam or I beam 190 disposed between channels 90. Energy absorbing elements 252 are wider than previously described energy absorbing elements 152. Also, energy absorbing assembly 170 provides four cutting zones 254 as compared to only two cutting zones 154 for energy absorbing assemblies 150 and 160.

During the initial contact between a moving vehicle and impact fence 82, a sharp spike or jolt in the force applied to the impacting vehicle by energy absorbing system 20 will before cutter plates 106 and 108 start to rip the respective energy absorbing elements 100. The magnitude of the initial spike or jolt may be minimized by reducing the overall weight of impact attenuator 80. The performance of energy absorbing system 20 to protect lightweight vehicles may be enhanced by reducing the weight of impact attenuator 80.

FIG. 20 is an exploded schematic drawing showing energy absorbing assembly 486 which may be satisfactorily used with energy absorbing system 20. Some of the differences between energy absorbing assemblies 86 and energy absorbing assembly 486 include variations in the length and thickness of the energy absorbing elements which are replaceably secured to energy absorbing assembly 486. Energy absorbing assembly 486 may be formed using supporting beams 90 as previously described with respect to energy absorbing assemblies 86 and 88.

For one application, supporting beams or C-channels 90 have an overall length of approximately eleven feet with a web width of approximately five inches and a flange height of approximately two inches. Multiple energy absorbing elements or rip plates 402, 404, 406, 408, 410 and 412 and multiple spacers 416 and 418 are preferably attached to C-channels 90 by threaded fasteners. For the example shown in FIG. 20, the same number and configuration of energy absorbing elements 402, 404, 406 of various lengths and thicknesses are secured on opposite sides of C-channels 90. For one application, energy absorbing elements 402, 404, 406, 408, 410, and 412 were formed from galvanized mild steel plates. The number of energy absorbing elements, their thickness and location on the exterior of energy absorbing assembly 486 is selected to provide the desired deceleration characteristics for various sizes and types of vehicles both during high speed and low speed impacts.

Spacers 416 and 418 are provided between energy absorbing elements 410 and 412 on both side of energy absorbing assembly 486. One of the technical benefits of the present invention includes the ability to vary the number, size and location of energy absorbing elements on each side of an energy absorbing assembly to provide the desired deceleration characteristics.

Centerline slot 102 is preferably formed in energy absorbing elements 402 and 404 immediately adjacent to the first end of energy absorbing assembly 486 to receive the associated cutter plate. For one application, slot 102 is formed along the centerline of energy absorbing elements 402 and 404 with an opening of approximately one and one-half inches tapering to a radius of approximately one-half inch in width over a length of approximately six inches. For some applications, energy absorbing elements 402 and 404 may be replaceably secured with the respective supporting beams 80 by using relatively short mechanical fastener 422. Also, the length of energy absorbing elements 402 and 404 is relatively short in comparison with other energy absorbing elements which are attached to and form a part of energy absorbing assembly 486. The use of relatively short mechanical fasteners 422 and relatively short energy absorbing elements 402 and 404 allow energy absorbing assembly 486 to be quickly repaired and returned to service after a relatively minor impact. Mechanical fasteners 424, preferably extend from one side of energy absorbing assembly 486 to the other side of energy absorbing assembly 486. Mechanical fasteners 422 and 444 may be bolts or hucks as previously described.

Energy absorbing elements 402, 404, 406, 408, 410 and 412 provide stopping force that has been tailored for specific vehicle weights. For example, during approximately the first seven feet of travel, as the associated impact attenuator 80 slides through bracket assembly 40, three stages of stopping force appropriate for a vehicle weighing approximately 820 kilograms are provided. The remaining three and a half feet of travel of energy absorbing assembly 486 provides stopping force that is appropriate for a much larger vehicle such as a vehicle weighing approximately 2,000 kilograms. Variations in the location, size, configuration and number of energy absorbing elements 402, 404, 406, 408, 410 and 412 allows energy absorbing assembly 486 to provide safe deceleration of vehicles weighing between 820 kilograms and 2,000 kilograms.

Energy absorbing element 200 as shown in FIG. 21 has been modified to reduce the effects of an initial impact between a moving vehicle and an energy absorbing system incorporating teachings of the present invention, particularly with respect to lightweight vehicles. For some applications, center line slot 202 at first end 201 of energy absorbing element 200 may have a width of approximately three quarters of an inch and a length of approximately six inches. A plurality of elongated, oval slots 204 are preferably formed along the center line of energy absorbing element 200 extending from slot 202. For one application, oval slots 204 have a length of approximately two and one half (2½) inches and a width of approximately three quarters (¾) of an inch. The distance between the center line of adjacent oval slots 204 is approximately three inches. The number of oval slots 204 and the dimensions of oval slots 204 may be varied depending upon the intended application for the associated energy absorbing assembly. For one application, energy absorbing element 200 has an overall length of forty-five (45) inches and a width of four and one half (4½) inches.

Oval slots 204 reduce the energy required to initiate ripping or shearing of energy absorbing element 200 on initial impact particularly with respect to a lightweight vehicle. Oval slots 204 cooperate with each other to substantially minimize the initial impact or jolt experienced by a lightweight vehicle colliding with impact fence 82.

For some applications, energy absorbing element 200 is preferably disposed immediately adjacent to the respective cutter plates 106 and 108. Limiting the overall length of energy absorbing element to approximately forty five (45) inches reduces the time and cost of returning energy absorbing system 20 to service following a collision by a lightweight vehicle or a slow speed vehicle with impact fence 82. After a collision which did not require absorbing a substantial amount of energy, it may only be necessary to replace energy absorbing elements 200 and not all of the energy absorbing elements which are attached to the associated energy absorbing assemblies 86 and 88.

Energy absorbing systems 20, 220 and 320 may be used to minimize the results of a collision between a motor vehicle traveling on a roadway and a roadway hazard. The roadway hazard may be either relatively slow moving highway service vehicles 22 or a fixed roadside hazard such as concrete barrier 310. A wide variety of energy absorbing assemblies may be fabricated in accordance with the teachings of the present invention by attaching an energy absorbing element or metal plate with a pair of supporting beams spaced laterally from each other. A cutter plate with one or more cutting edges may be energy absorbing element between the supporting beams to dissipate kinetic energy from impact by a motor vehicle by ripping or tearing the associated energy absorbing element.

Although the present invention has been described in detail, it should be understood that various changes, substitutions and alterations can be made hereto without departing from the spirit and scope of the invention as defined by the appended claims.

What is claimed is:

1. An energy absorbing system to minimize the results of a collision between a vehicle traveling on a roadway and a roadway hazard comprising:
   a bracket assembly with an impact attenuator coupled thereto and extending therefrom;
   the bracket assembly and the impact attenuator disposed between the roadway hazard and oncoming traffic on the roadway;
   the impact attenuator having a cutter plate and at least one energy absorbing element slidably mounted relative to the cutter plate;
   the energy absorbing element having a first end and a second end with the second end spaced longitudinally from the first end;
   the first end of the energy absorbing element disposed adjacent to the cutter plate and the second end disposed longitudinally therefrom; and
   an impact fence mounted on the impact attenuator facing the oncoming traffic opposite from the cutter plate whereby a collision of the vehicle with the impact fence will cause the energy absorbing element to slide longitudinally relative to the cutter plate and dissipate energy from the impact of the vehicle by shearing the energy absorbing element.

2. The energy absorbing system of claim 1 further comprising:
   the bracket assembly and the impact attenuator rotatably mounted on the rear portion of a highway service vehicle;
   the impact attenuator having a first end and a second end;
   the first end of the impact attenuator slidably coupled to the bracket assembly;
   the impact fence attached to the second end of the impact attenuator opposite from the bracket assembly;
   the cutter plate attached to the bracket assembly;
   at least one breakaway strut attached to both the bracket assembly and the rear portion of the highway service vehicle;
   the breakaway strut releasably holding the bracket assembly in a first position with the impact attenuator extending horizontally from the highway service vehicle at a first distance above the roadway; and
   the breakaway strut allowing the bracket assembly to move to a second position with the impact attenuator at a second, lower distance above the roadway to allow at least one portion of the impact attenuator to slide longitudinally under the highway service vehicle.

3. The energy absorbing system of claim 1 further comprising:
   the bracket assembly mounted on a trailer;
   a hitch provided on the trailer for use in attaching the trailer to the rear portion of a highway service vehicle; and
   the trailer sized to position the bracket assembly at a vertical distance above the roadway to allow at least one portion of the impact attenuator to slide longitudinally under the highway service vehicle.

4. The energy absorbing system of claim 1 wherein the impact attenuator further comprises:
   a pair of energy absorbing assemblies spaced from each other;
   one end of each energy absorbing assembly slidably coupled to the bracket assembly;
   the impact fence attached to the other end of each energy absorbing assembly opposite from the bracket assembly;
   each energy absorbing assembly further comprising at least one energy absorbing element; and
   a pair of cutter plates attached to the bracket assembly adjacent to respective energy absorbing assemblies whereby the collision between the vehicle and the impact fence will result in each cutter plate shearing at least one respective energy absorbing element to dissipate energy from the impact by the vehicle.

5. The energy absorbing system of claim 4 wherein each energy absorbing assembly further comprises:
   a pair of supporting beams disposed longitudinally parallel with each other;
   the supporting beams spaced from each other;
   a pair of energy absorbing elements attached respectively to opposite sides of each supporting beam; and
   the distance between the supporting beams selected to allow the respective cutter plate to shear each energy absorbing element to dissipate energy from the impact by the vehicle.

6. The energy absorbing system of claim 1 wherein the impact attenuator further comprises:
   at least one energy absorbing assembly having one end slidably coupled to the bracket assembly;
   the cutter plate pivotally attached to the bracket assembly;
   the impact fence attached to the other end of the energy absorbing assembly opposite from the bracket assembly; and the energy absorbing assembly further comprising the energy absorbing element whereby the collision between the vehicle and the impact fence will result in the cutter plate shearing the energy absorbing element to dissipate energy from the impact by the vehicle.

7. The energy absorbing system of claim 6 wherein the energy absorbing assembly further comprises:
- a pair of supporting beams disposed longitudinally parallel with each other;
- the supporting beams spaced from each other;
- a pair of energy absorbing elements attached respectively to opposite sides of each supporting beam; and
- the distance between the supporting beams selected to allow the cutter plate to shear each energy absorbing element to dissipate energy from the impact by the vehicle.

8. The energy absorbing system of claim 1 wherein the impact attenuator further comprises:
- the cutter plate pivotally attached to the bracket assembly;
- at least one energy absorbing assembly having a plurality of energy absorbing elements attached thereto with one end of the energy absorbing assembly slidably coupled to the bracket assembly;
- the plurality of energy absorbing elements aligned with the cutter plate; and
- the energy absorbing elements having a variation in thickness along the length of the energy absorbing assembly whereby an increasing amount of force is required to move the cutter plate through the energy absorbing elements.

9. The energy absorbing system of claim 1 wherein the impact attenuator further comprises:
- at least one energy absorbing assembly having one end slidably coupled to the bracket assembly;
- the cutter plate pivotally attached to the bracket assembly;
- the impact fence attached to the other end of the energy absorbing assembly opposite from the bracket assembly; and
- a hold down strut secured to the bracket assembly adjacent to the energy absorbing assembly to maintain alignment between the energy absorbing assembly and the respective cutter plate.

10. The energy absorbing system of claim 1 wherein the cutter plate comprises a blade that is oriented with respect to the longitudinal direction of the energy absorbing element at an angle that is less than ninety degrees so as to cause the energy absorbing element to fail in tension.

11. The energy absorbing system of claim 1 wherein the energy absorbing element comprises one or more metal plates.

12. The energy absorbing system of claim 11 wherein there are openings through the plate, which openings are spaced apart from each other along the longitudinal direction of the plate.

13. An impact attenuator for minimizing the results of a collision between a vehicle and a roadway hazard comprising:
- a pair of energy absorbing assemblies extending longitudinally parallel with each other;
- the energy absorbing assemblies spaced from each other;
- a bracket assembly slidably coupled to one end of each energy absorbing assembly and the energy absorbing assemblies extending longitudinally therefrom;
- an impact fence attached to the other end of each energy absorbing assembly opposite from the bracket assembly;
- each energy absorbing assembly having at least one energy absorbing element; and
- a pair of cutter plates attached to the bracket assembly adjacent to and aligned respectively with the energy absorbing assemblies whereby a collision between the vehicle and the impact fence will result in the cutter plates shearing the respective energy absorbing elements to dissipate energy from the vehicle collision.

14. The impact attenuator of claim 13 with the roadway hazard consisting of either a slow moving highway service vehicle or a fixed roadside hazard.

15. The impact attenuator of claim 13 further comprises:
- the pair of energy absorbing assemblies spaced from each other and extending longitudinally parallel with each other between the bracket assembly and the impact fence;
- a plurality of cross braces extending between the energy absorbing assemblies whereby the energy absorbing assemblies, cross braces and impact fence cooperate with each other to form a rigid frame structure; and
- the pair of cutter plates pivotally attached to the bracket assembly adjacent to the respective energy absorbing assemblies.

16. The impact attenuator of claim 13 wherein each energy absorbing assembly further comprises:
- a pair of supporting beams disposed longitudinally parallel with each other;
- the supporting beams spaced from each other;
- at least two energy absorbing elements attached to opposite sides of each supporting beam; and
- the distance between the supporting beams selected to allow the respective cutter plate to shear the respective energy absorbing elements to dissipate energy from the vehicle collision.

17. The impact attenuator of claim 16 wherein each energy absorbing assembly further comprises:
- each supporting beam having a generally C-shaped cross-section;
- the energy absorbing elements attached to opposite sides of each supporting beam with the generally C-shaped cross-sections of the respective supporting beams facing each other to define a generally hollow rectangular cross section for the resulting energy absorbing assembly; and
- each energy absorbing element attached to the respective supporting beams by releasable fasteners to allow replacement of the energy absorbing element.

18. The impact attenuator of claim 13 wherein each energy absorbing assembly further comprises:
- a pair of supporting beams disposed longitudinally parallel with each other;
- the supporting beams spaced from each other;
- a plurality of energy absorbing elements attached to one side of each supporting beam;
- a plurality of energy absorbing elements attached to the opposite side of each supporting beam; and
- a spacer disposed between selected energy absorbing elements.

19. The impact attenuator of claim 13 wherein each energy absorbing assembly further comprises:
- three supporting beams extending longitudinally parallel with each other;
- the supporting beams spaced laterally from each other;
- at least one energy absorbing element attached to each supporting beam;

at least one cutter plate attached to the bracket assembly adjacent to one end of the energy absorbing element; and the lateral distance between the supporting beams selected to allow the respective cutter plate to shear the portion of the energy absorbing element between the respective supporting beams to dissipate energy from the vehicle collision.

20. The impact attenuator of claim 19 wherein the supporting beams further comprise:

a first supporting beam having a generally C-shaped cross-section;

a second supporting beam having a generally I-shaped cross-section;

a third supporting beam having a generally C-shaped cross-section; and the second supporting beam disposed longitudinally between the first supporting beam and the third supporting beam.

21. The impact attenuator of claim 13 further comprising:

each cutter plate having a pair of cutting edges; and each energy absorbing assembly having at least two energy absorbing elements with each cutting edge respectively disposed at an acute angle relative to at least one of the energy absorbing elements.

22. A method to minimize the effects of a collision between a motor vehicle traveling on a roadway and a roadway hazard comprising the steps of:

forming at least one energy absorbing assembly from a pair of supporting beams;

attaching at least one energy absorbing element to the supporting beams;

installing a cutter plate in a bracket assembly and mounting the bracket assembly adjacent to the roadway hazard;

slidably coupling the energy absorbing assembly to the bracket assembly with the cutter plate disposed adjacent to one end of the energy absorbing element and the energy absorbing element extending longitudinally from the bracket assembly; and attaching an impact fence with one end of the energy absorbing assembly opposite from the bracket assembly whereby a collision between the motor vehicle and the impact fence will result in the cutter plate shearing the energy absorbing element to dissipate energy from the impact by the motor vehicle.

23. The method of claim 22 further comprising the steps of:

rotatably mounting the bracket assembly on the rear portion of a highway service vehicle;

releasably securing the bracket assembly in a first position with the energy absorbing assembly extending longitudinally from the rear portion of the highway service vehicle at a first vertical distance above to the roadway; and moving the bracket assembly to a second position with the impact attenuator at a second, lower distance above the roadway to allow at least one portion of the energy absorbing assembly to slide longitudinally under the highway service vehicle in response to the collision between the moving vehicle and the impact fence.

24. The method of claim 23 further comprising the step of placing the energy absorbing assembly and the bracket assembly at one end of a fixed roadside hazard with the impact fence facing oncoming traffic on the roadway.

25. The method of claim 23 further comprising the steps of:

forming the energy absorbing assembly from at least one support beam having a generally C-shaped cross section;

attaching a guide plate to at least one side of the cutter plate; and placing the guide plate within the C-shaped cross section to maintain alignment of the energy absorbing assembly with the respective cutter plate.

26. A truck mounted attenuator for mounting on the rear portion of a highway service vehicle to minimize the results of a collision between a motor vehicle traveling on a roadway and the highway service vehicle comprising:

a bracket assembly rotatably mounted on the rear portion of the highway service vehicle;

an impact attenuator with one end slidably coupled to the bracket assembly;

an impact fence attached to the other end of the impact attenuator opposite from the bracket assembly;

the bracket assembly having a first position with the impact attenuator extending horizontally from the rear portion of the highway service vehicle at a first distance above the roadway;

the bracket assembly having a second position with the impact attenuator at a second, lower distance above the roadway to allow at least one portion of the impact attenuator to slide longitudinally under the highway service vehicle as a result of a collision by the motor vehicle with the impact fence;

the impact attenuator having at least two energy absorbing assemblies and the bracket assembly having at least two cutter plates with each cutter plate respectively aligned with one end of each energy absorbing assembly; and a hold down strut mounted on the bracket assembly adjacent to each cutter plate whereby a portion of the hold down strut contacts the respective energy absorbing assembly to maintain alignment with the respective cutter plate as the impact attenuator slides through the bracket assembly when the bracket assembly is in its second position.

27. An energy absorbing system to minimize the results of a collision between a moving vehicle and a roadway hazard comprising:

a bracket assembly and an impact attenuator having a first end coupled with the bracket assembly and a second end extending longitudinally from the bracket assembly;

the bracket assembly and the impact attenuator disposed adjacent to the roadway hazard with the second end of the impact attenuator facing oncoming traffic;

the impact attenuator having at least one replaceable energy absorbing element with an elongated slot formed therein;

the bracket assembly having at least one cutter plate with the cutter plate and the energy absorbing element slidably mounted relative to each other;

a first end of the energy absorbing element disposed adjacent to the cutter plate;

an impact fence mounted adjacent to the second end of the impact attenuator; and the size of the impact fence selected to allow a collision between the moving vehicle and the impact fence to result in the cutter plate ripping the energy absorbing element to dissipate energy from the vehicle collision.

28. The energy absorbing system of claim 27 further comprising the bracket assembly and the impact attenuator having a first position extending generally horizontal at a first vertical distance above the roadway, a second position extending generally horizontally at a second, lower vertical distance above the roadway and a third position with the impact attenuator extending generally vertical relative to the roadway.

29. The energy absorbing system of claim 28 further comprising:

an electrical winch and a strap with one end of the strap attached to the electrical winch;

an opposite end of the strap attached to the impact attenuator intermediate the ends; and the electrical winch and the straps cooperating with each other to raise and lower the impact attenuator between its first position and its third position.

30. The energy absorbing system of claim 28 further comprising a latch for releasably securing the impact attenuator in its third position.

31. The energy absorbing system of claim 28 further comprising means for raising and lowering the impact attenuator between its first position and its third position.

32. The energy absorbing system of claim 28 further comprising means for releasably securing the impact attenuator in its third position.

33. A method to minimize the effects of a collision between a motor vehicle traveling on a roadway and a roadway hazard, comprising the steps of:

providing an elongated energy absorbing element with first and second ends between the roadway hazard and oncoming traffic on the roadway such that the first end is mounted to the roadway hazard, with the energy absorbing element being oriented so as to have the second end extending therefrom;

providing a cutter blade near the first end;

impacting the second end of the energy absorbing element;

dissipating the energy from the impact by allowing the energy absorbing element to slide relative to the cutter blade while the cutter blade divides the energy absorbing element, the cutter blade dividing the energy absorbing element by stretching the energy absorbing element and causing the energy absorbing element to fail in tension.

34. The method of claim 33 wherein the roadway hazard is a highway service vehicle, with the first end of the energy absorbing element being mounted to the rear portion of the highway service vehicle, further comprising the step of, after impacting the second end of the energy absorbing element and before the step of allowing the energy absorbing element to slide past the cutter blade, dropping the energy absorbing element from a first position to a second position so as to allow the energy absorbing element to pass beneath the highway service vehicle as the energy absorbing element slides relative to the cutter blade.

* * * * *